United States Patent
Yang et al.

(10) Patent No.: US 10,675,713 B2
(45) Date of Patent: Jun. 9, 2020

(54) REMOTE LASER WELDING OF OVERLAPPING METAL WORKPIECES USING HELICAL PATH(S)

(71) Applicant: GM GLOBAL TECHNOLOGY OPERATIONS LLC, Detroit, MI (US)

(72) Inventors: David Yang, Shanghai (CN); Wu Tao, Tianmen (CN); Paolo A. Novelletto, LaSalle (CA); Yu Pan, Beijing (CN); Justin Wolsker, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 422 days.

(21) Appl. No.: 15/659,092

(22) Filed: Jul. 25, 2017

(65) Prior Publication Data

US 2018/0043472 A1 Feb. 15, 2018

Related U.S. Application Data

(60) Provisional application No. 62/373,432, filed on Aug. 11, 2016.

(51) Int. Cl.
| | |
|---|---|
| B23K 26/244 | (2014.01) |
| B23K 26/082 | (2014.01) |
| B23K 26/322 | (2014.01) |
| B23K 26/08 | (2014.01) |
| B23K 101/34 | (2006.01) |
| B23K 103/16 | (2006.01) |

(52) U.S. Cl.
CPC .......... B23K 26/244 (2015.10); B23K 26/082 (2015.10); B23K 26/0876 (2013.01); B23K 26/322 (2013.01); B23K 2101/34 (2018.08); B23K 2103/166 (2018.08)

(58) Field of Classification Search
None
See application file for complete search history.

(56) References Cited

U.S. PATENT DOCUMENTS

| 9,815,142 | B2 * | 11/2017 | Ogura | B23K 26/22 |
|---|---|---|---|---|
| 2008/0029498 | A1 * | 2/2008 | Forrest | B23K 26/0604 |
| | | | | 219/121.73 |
| 2008/0067251 | A1 * | 3/2008 | Yoshimoto | B41J 2/471 |
| | | | | 235/462.32 |
| 2013/0206821 | A1 * | 8/2013 | Saito | B23K 20/02 |
| | | | | 228/208 |

* cited by examiner

*Primary Examiner* — Ibrahime A Abraham
*Assistant Examiner* — Elizabeth M Sims
(74) *Attorney, Agent, or Firm* — Reising Ethington P.C.

(57) ABSTRACT

A method of laser welding a workpiece stack-up that includes two or more overlapping metal workpieces is disclosed. The disclosed method includes directing a laser beam at a top surface of the workpiece stack-up to create a molten metal weld pool and, optionally, a keyhole, and further gyrating the laser beam to move a focal point of the laser beam along a helical path having a central helix axis oriented transverse to the top and bottom surfaces of the workpiece stack-up. The gyration of the laser beam may even be practiced to move the focal point of the laser beam along a plurality of helical paths so as to alternately convey the focal point back-and-forth in a first overall axial direction and a second overall axial direction while advancing the laser beam relative to the top surface of the workpiece stack-up along a beam travel pattern.

20 Claims, 8 Drawing Sheets

REMOTE LASER WELDING OF OVERLAPPING METAL WORKPIECES USING HELICAL PATH(S)

CROSS-REFERENCE TO RELATED APPLICATION(S)

This application claims the benefit of U.S. Provisional Application No. 62/373,432 filed on Aug. 11, 2016. The entire contents of the aforementioned provisional application are incorporated herein by reference.

TECHNICAL FIELD

The technical field of this disclosure relates generally to laser welding and, more particularly, to a method of laser welding together two or more overlapping metal workpieces in which all of the overlapping metal workpieces in the stack-up are steel workpieces or aluminum workpieces.

INTRODUCTION

Laser welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) that extends through an intended weld site. A laser beam is then directed towards and impinges a top surface of the workpiece stack-up. The heat generated from the absorption of energy from the laser beam initiates melting of the metal workpieces down through the metal workpiece impinged by the laser beam and into the underlying metal workpiece(s) to a depth that intersects each of the established faying interfaces. And, if the power density of the laser beam is high enough, a keyhole is produced within the workpiece stack-up. A keyhole is a column of vaporized metal, which may include plasma, derived from the metal workpieces. The keyhole is surrounded by molten workpiece metal and is an effective absorber of energy from the laser beam, thus allowing for deep and narrow penetration of molten workpiece metal into the stack-up compared to instances in which a keyhole is not present.

The laser beam melts the metal workpieces in the workpiece stack-up in very short order once it impinges the top surface of the stack-up. After the metal workpieces are initially melted, the laser beam may be advanced relative to the top surface of the workpiece stack-up along a predefined path that can assume any of a wide variety of geometric profiles. As the laser beam is advanced along the top surface of the stack-up, the molten workpiece metal flows around and behind the advancing laser beam within the workpiece stack-up. This penetrating molten workpiece metal quickly cools and solidifies into resolidified composite metal workpiece material. Eventually, the transmission of the laser beam at the top surface of the workpiece stack-up is ceased, at which time the keyhole collapses, if present, and any molten workpiece metal still remaining within the stack-up solidifies. The collective resolidified composite metal workpiece material obtained by operation of the laser beam constitutes a laser weld joint that autogenously fusion welds the overlapping metal workpieces together.

The automotive industry is interested in using laser welding to manufacture parts that can be installed on a vehicle. In one example, a vehicle door body may be fabricated from an inner door panel and an outer door panel that are joined together by a plurality of laser weld joints. The inner and outer door panels are first stacked relative to each other and secured in place by clamps. A laser beam is then sequentially directed at multiple weld sites around the stacked panels in accordance with a programmed sequence to form the plurality of laser weld joints. The process of laser welding inner and outer door panels—as well as other vehicle component parts such as those used to fabricate hoods, deck lids, body structures such as body sides and cross-members, load-bearing structural members, engine compartments, etc.—is typically an automated process that can be carried out quickly and efficiently. The aforementioned desire to laser weld metal workpieces together is not unique to the automotive industry; indeed, it extends to other industries that may utilize laser welding including the aviation, maritime, railway, and building construction industries, among others.

The use of laser welding to join together certain metal workpieces that are often used in manufacturing practices can present challenges. For example, steel workpieces often include a zinc-based surface coating (e.g., zinc or a zinc-iron alloy) for corrosion protection. Zinc has a boiling point of about 906° C., while the melting point of the underlying steel substrate it coats is typically greater than 1300° C. Thus, when a steel workpiece that includes a zinc-based surface coating is laser welded, high-pressure zinc vapors are readily produced at the surfaces of the steel workpiece and have a tendency to disrupt the laser welding process. In particular, the zinc vapors produced at the faying interface(s) of the steel workpieces can diffuse into the molten steel created by the laser beam unless an alternative escape outlet is provided through the workpiece stack-up. When an adequate escape outlet is not provided, zinc vapors may remain trapped in the molten steel as it cools and solidifies, which may lead to defects in the resulting laser weld joint—such as porosity—as well as other weld joint discrepancies including blowholes, spatter, and undercut joints. These weld joint deficiencies, if sever enough, can unsatisfactorily degrade the mechanical properties of the laser weld joint.

Steel workpieces that are used in manufacturing practices may also include other types of surface coatings for performance-related reasons in lieu of zinc-based coatings. Other notable surface coatings include aluminum-based coatings such as aluminum, an aluminum-silicon alloy, an aluminum-zinc alloy, or an aluminum-magnesium alloy, to name but a few examples. Unlike zinc-based surface coatings, aluminum-based surface coatings do not boil at a temperature below the melting point of steel, so they are unlikely to produce high-pressure vapors at the faying interface(s) of the workpiece stack-up. Notwithstanding this fact, these surface coatings can be melted, especially if a keyhole is present, and, when in a molten state, can combine with the molten steel derived from the bulk of the steel workpieces. The introduction of such disparate molten materials into the molten steel can lead to a variety of weld defects that have the potential to degrade the mechanical properties of the laser weld joint. Molten aluminum or aluminum alloys (e.g., AlSi, AlZn, or AlMg alloys), for instance, can diminish the purity of the molten steel and form brittle Fe—Al intermetallic phases within the weld joint as well as negatively affect the cooling behavior of the molten steel.

Aluminum workpieces are another intriguing candidate for many automobile component parts and structures due to their high strength-to-weight ratios and their ability to improve the fuel economy of the vehicle. Aluminum workpieces, however, almost always include a surface coating that covers an underlying bulk aluminum substrate. This coating may be a refractory oxide coating that forms passively when fresh aluminum is exposed to atmospheric air or some other oxygen-containing medium. Such refractory oxide surface coatings are comprised of aluminum oxides as well as potentially other metal oxides. In other instances, the surface coating may be a metallic coating comprised of zinc or tin, or it may be a metal oxide conversion coating comprised of oxides of titanium, zirconium, chromium, or silicon, as disclosed in U.S. Patent Application No. US2014/0360986, the entire contents of which are incorporated herein by reference. The surface coating inhibits corrosion of the underlying aluminum substrate through any of a variety of mechanisms depending on the composition of the coating and may provide other favorable enhancements as well.

One of the main challenges involved in laser welding aluminum workpieces is the relatively high solubility of hydrogen in molten aluminum. Upon solidification of the molten aluminum, dissolved hydrogen becomes trapped, leading to porosity within the laser weld joint. In addition to the challenges posed by hydrogen solubility, the surface coating commonly included in the aluminum workpieces is believed to contribute to the formation of weld defects in the laser weld joint. When, for example, the surface coating of one or more of the aluminum workpieces is a refractory oxide coating, residual oxides can contaminate the molten aluminum created by the laser beam due to the high melting point and mechanical toughness of the coating. In another example, if the surface coating is zinc, the coating may readily vaporize to produce high-pressure zinc vapors that may diffuse into and through the molten aluminum, thus leading to porosity within the weld joint and other weld deficiencies unless provisions are made to vent the zinc vapors away from the weld site. A variety of other challenges may also complicate the laser welding process in a way that adversely affects the mechanical properties of the laser weld joint.

SUMMARY

A method of laser welding a workpiece stack-up that includes overlapping metal workpieces is disclosed. The workpiece stack-up includes two or more metal workpieces, with all of the metal workpieces in the stack-up being steel workpieces or aluminum workpieces. In other words, the workpiece stack-up includes two or more overlapping steel workpieces or two or more overlapping aluminum workpieces. The various metal workpieces included in each of the aforementioned workpiece stack-ups presents challenges when trying to join the workpieces together with a laser beam. The disclosed laser welding method seeks to counter those challenges by gyrating the laser beam to move a focal point of the laser beam along at least one helical path. Maneuvering the laser beam in this way helps achieve laser weld joints with good mechanical properties. The disclosed laser welding method can be performed without requiring—but of course not prohibiting—the conventional industry practice of intentionally imposing gaps between the metal workpieces at the faying interface(s), typically by laser scoring or mechanical dimpling, as a mechanism to try and alleviate the diffusion of vapors into the molten workpiece metal.

The disclosed laser welding method involves providing a workpiece stack-up that includes two or more overlapping metal workpieces (e.g., two or more overlapping steel or aluminum workpieces). The metal workpieces are fitted and stacked together such that a faying interface is formed between the faying surfaces of each pair of adjacent overlapping metal workpieces at a weld site. For example, in one embodiment, the workpiece stack-up includes first and second metal workpieces having first and second faying surfaces, respectively, that overlap and confront one another to establish a single faying interface. In another embodiment, the workpiece stack-up includes an additional third metal workpiece situated between the first and second metal workpieces. In this way, the first and second metal workpieces have first and second faying surfaces, respectively, that overlap and confront opposed faying surfaces of the third metal workpiece to establish two faying interfaces. When a third metal workpiece is present, the first and second metal workpieces may be separate and distinct parts or, alternatively, they may be different portions of the same part, such as when an edge of one part is folded over a free edge of another part.

After the workpiece stack-up is assembled and provided, a laser beam is directed at a top surface of the workpiece stack-up. The laser beam impinges the top surface at a beam spot. The term "beam spot," as used herein, broadly refers to the sectional surface area of the laser beam as projected onto a plane oriented along the top surface of the workpiece stack-up. The focused energy of the laser beam is absorbed by the metal workpieces to create a molten metal weld pool that penetrates into the workpiece stack-up from the top surface towards the bottom surface while intersecting each faying interface established within the stack-up. The power density of the delivered laser beam is selected to carry out the practice of laser welding in either conduction welding mode or keyhole welding mode. In conduction welding mode, the power density of the laser beam is relatively low, and the energy of the laser beam is conducted as heat through the metal workpieces to create only the molten metal weld pool. In keyhole welding mode, the power density of the laser beam is high enough to vaporize the metal workpieces beneath the beam spot of the laser beam to produce a keyhole that is surrounded by the molten metal weld pool. The keyhole provides a conduit for efficient energy absorption deeper into the workpiece stack-up which, in turn, facilitates deeper and narrower penetration of the molten metal weld pool. The molten metal weld pool and the keyhole, if formed, may fully or partially penetrate the workpiece stack-up.

In an effort to distribute heat and energy more uniformly within the workpiece stack-up and, if applicable, stabilize the keyhole, the laser beam is gyrated to move a focal point of the laser beam along at least one helical path having a central helix axis oriented transverse to the top and bottom surfaces of the stack-up. The helical path may have many different spatial geometric shapes so long as movement of the focal point along the helical path results in the focal point winding around the central helix axis along a plurality of turnings, with each of the turnings having a radius and a pitch measured parallel to the central helix axis, to thus convey the focal point in an overall axial direction. For example, the helical path may be a cylindrical helical path, a conical helical path, a helical path that includes an upper conical helical portion and a lower conical helical portion whose turnings either increase or decrease in radius towards one another, as well as a multitude of other helical geometries not explicitly mentioned. The laser beam may be gyrated to move the focal point along a single helical path or a plurality of helical paths. Moving the focal point along a plurality of helical paths has the effect of alternately conveying the focal point back-and-forth in opposite overall axial directions.

The manner in which the gyration of the laser beam contributes to the formation of a laser weld joint may depend on the size of the helical path(s). If, for instance, the maximum radius of the plurality of turnings of a helical path is relatively large, such as between 2 mm and 20 mm, the movement of the focal point along the helical path typically causes the beam spot of the laser beam to be advanced relative to the top surface of the workpiece stack-up in a two-dimensional course that reflects the movement of the focal point along the helical path. For example, if the helical path is a cylindrical helical path in which the radius of each of the plurality of turnings ranges between 2 mm and 20 mm, then movement of the focal point of the laser beam along the cylindrical helical path will advance the beam spot repeatedly in a common defined circular course on the top surface of the workpiece stack-up. As another example, if the helical path is a conical helical path with a maximum radius of the plurality of turnings ranging between 2 mm and 20 mm, then movement of the focal point of the laser beam along the conical helical path will advance the beam spot in a defined spiral course on the top surface of the workpiece stack-up.

If, on the other hand, the maximum radius of the plurality of turnings of a helical path is relatively small, such as between 50 μm and 2 mm, the movement of the focal point along the helical path does little to move the beam spot and typically does not reflect itself into a defined two-dimensional course on the top surface of the workpiece stack-up. In this scenario, to obtain a laser weld joint of reasonable size, the laser beam (and thus the beam spot) may be advanced along a beam travel pattern relative to the top surface of the workpiece stack-up while being gyrated to move the focal point of the laser beam along a plurality of helical paths so as to alternately convey the focal point back-and-forth in opposite overall axial directions as the laser beam is progressing along the travel pattern. The beam travel pattern traced by the laser beam may be a linear stitch pattern, a curved or C-shaped staple pattern, a spiral pattern, a circle pattern, an elliptical pattern, an oscillating pattern, or any other desired beam travel pattern as projected onto the top surface of the workpiece stack-up. The gyration of the laser beam that occurs while the laser beam is being advanced along the beam travel pattern may move the focal point of the laser beam along helical paths of the same geometric configuration, meaning that each helical path in the plurality of paths is the same in terms of size and geometry. In an alternative embodiment, the plurality of helical paths may include paths of different sizes and/or geometric configurations.

The gyration of the laser beam, however implemented, and the optional advancement of the laser beam along the beam travel pattern translates the molten metal weld pool and the keyhole, if present, along a route within the stack-up that corresponds to the patterned movement of the laser beam (and thus the beam spot) relative to the top surface of the stack-up. Such consequential movement of the laser beam as a result of gyrating the laser beam and optionally advancing the laser beam along the beam travel pattern causes the molten metal weld pool to flow around and behind the laser beam—particularly if a keyhole is present—and to elongate in the wake of the progressing laser beam. Depending on the size and geometry of the helical path(s), and the two-dimensional geometry of the optional beam travel pattern, the molten metal weld pool may solidify into a defined trail behind the forward advancement of the laser beam, or it may merge and grow into a larger melt puddle that solidifies into a consolidated nugget. Regardless of its final shape and structure, the resolidified composite metal workpiece material obtained from translating the molten metal weld pool through the workpiece stack-up is comprised of material from each of the metal workpieces penetrated by the weld pool. The collective resolidified composite metal workpiece material constitutes the laser weld joint that autogenously fusion welds the workpieces together.

The gyration of the laser beam is believed to positively impact the mechanical properties of the obtained laser weld joint. In particular, the movement of the focal point of the laser beam along the helical path(s) continually changes the size of the beam spot of the laser beam, which, in turn, varies the irradiance (also known as the intensity or power density) of the laser beam at the top surface of the workpiece stack-up over the period of time the focal point is being moved along the helical path(s). Such irradiance variances of the laser beam-whether through an irradiance increase or an irradiance decrease at the top surface of the stack-up— can help realize a more consistent and uniform heat input within the workpiece stack-up beneath the beam spot. A more consistent and uniform heat input can assist in stabilizing the molten metal weld pool and the keyhole, if present, and can further slow zinc vaporization (for steel workpieces) and help eliminate heat build-up, which is a contributing factor to weld drop out, since the helical path(s) inherently neutralize the localized absorption of laser beam energy and the concentration of heat within the workpiece stack-up. Additionally, the movement of the focal point along the helical path(s) may act to agitate the molten metal weld pool and, thus, help to promote the release of gases trapped within the molten material of the weld pool, thereby inhibiting porosity formation in the obtained laser weld joint.

DETAILED DESCRIPTION

Figure 1:
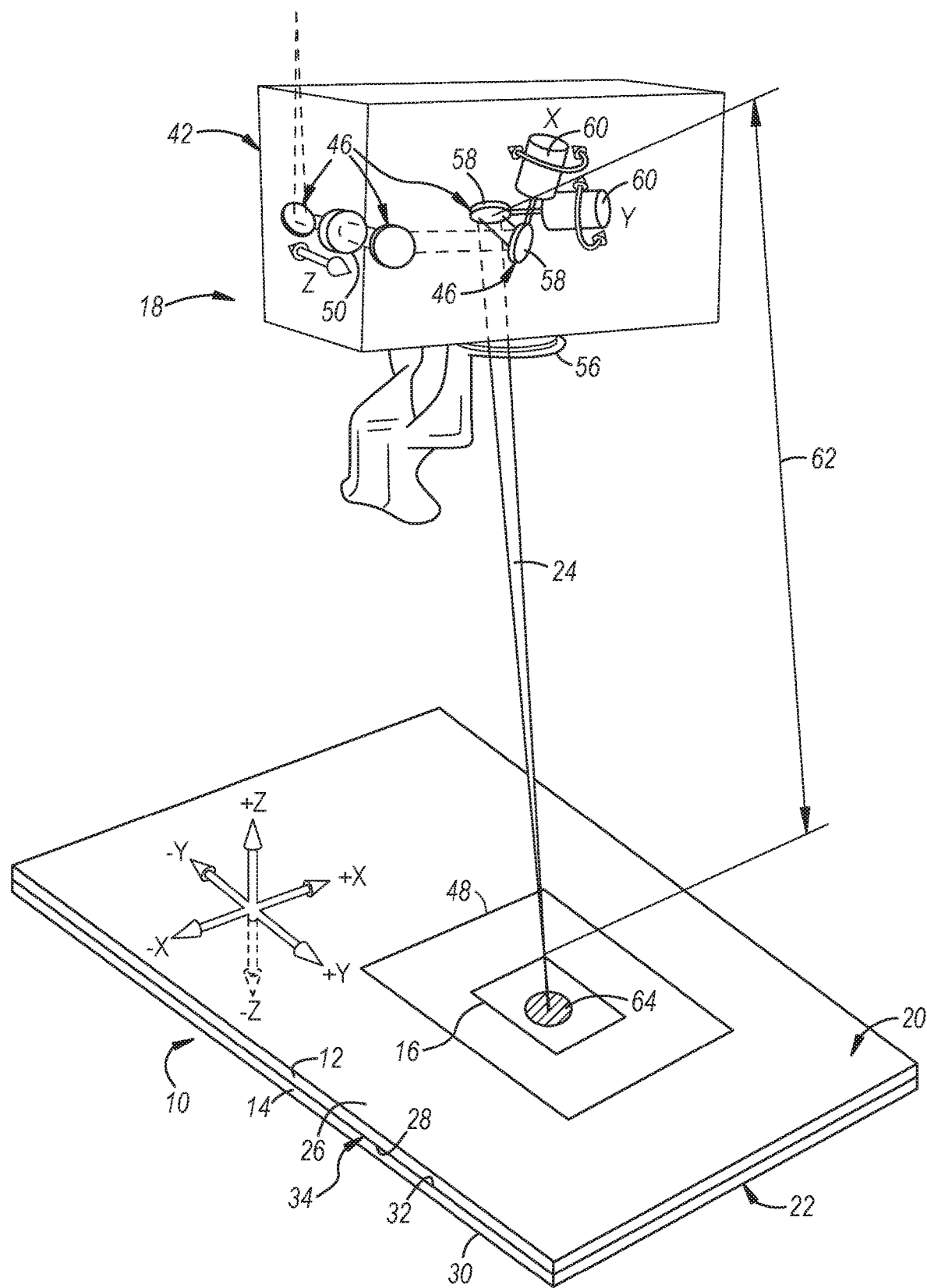
FIG. 1 is a perspective view of an embodiment of a remote laser welding apparatus for forming a laser weld joint within a workpiece stack-up that includes two or more overlapping metal workpieces, wherein the laser weld joint fusion welds the two or more metal workpieces together.

The disclosed method of laser welding a workpiece stack-up comprised of two or more overlapping metal workpieces involves forming a laser weld joint with a laser beam with the added assistance of gyrating the laser beam in a particular fashion—that is, the laser beam is gyrated to move a focal point of the laser beam along at least one helical path having a central helix axis oriented transverse to a top surface (which the laser beam is directed at) and an oppositely-facing bottom surface of the workpiece stack-up. The laser beam may be a solid-state laser beam or a gas laser beam depending on the characteristics and compositions of the metal workpieces being joined and the laser welding apparatus being used. Some notable solid-state lasers that may be used are a fiber laser, a disk laser, a direct diode laser, and a Nd:YAG laser, and a notable gas laser that may be used is a $CO_2$ laser, although other types of lasers may certainly be used. The disclosed laser welding method is preferably carried out by way of remote laser welding. A preferred implementation of a remote laser welding apparatus is described in more detail below.

The laser welding method may be performed on a variety of workpiece stack-up configurations. For example, the disclosed method may be used in conjunction with a "2T" workpiece stack-up (FIGS. 2 and 16) that includes two overlapping and adjacent metal workpieces, or it may be used in conjunction with a "3T" workpiece stack-up (FIGS. 17-18) that includes three overlapping and adjacent metal workpieces. Still further, in some instances, the disclosed method may be used in conjunction with a "4T" workpiece stack-up (not shown) that includes four overlapping and adjacent metal workpieces. Additionally, the several metal workpieces included in the workpiece stack-up may have similar or dissimilar compositions, provided they are part of the same base metal group (e.g., steel or aluminum) and may have similar or dissimilar thicknesses at the weld site, if desired. The laser welding method is carried out in essentially the same way to achieve the same results regardless of whether the workpiece stack-up includes two overlapping metal workpieces or more than two overlapping metal workpieces. Any differences in workpiece stack-up configurations can be easily accommodated by adjusting the laser welding process.

Referring now to FIGS. 1-16, a method of remote laser welding a workpiece stack-up 10 is shown in which the stack-up 10 includes at least a first metal workpiece 12 and a second metal workpiece 14 that overlap at a weld site 16 where remote laser welding is conducted using a remote laser welding apparatus 18. The first and second metal workpieces 12,14 provide a top surface 20 and a bottom surface 22, respectively, of the workpiece stack-up 10. The top surface 20 of the workpiece stack-up 10 is made available to the remote laser welding apparatus 18 and is accessible by a laser beam 24 emanating from the remote laser welding apparatus 18. And since only single side access is needed to conduct laser welding, there is no need for the bottom surface 22 of the workpiece stack-up 10 to be made available to the remote laser welding apparatus 18 in the same way as the top surface 20. Moreover, while only one weld site 16 is depicted in the Figures for the sake of simplicity, skilled artisans will appreciate that laser welding in accordance with the disclosed laser welding method can be practiced at multiple different weld sites spread throughout the same workpiece stack-up.

Figure 2:
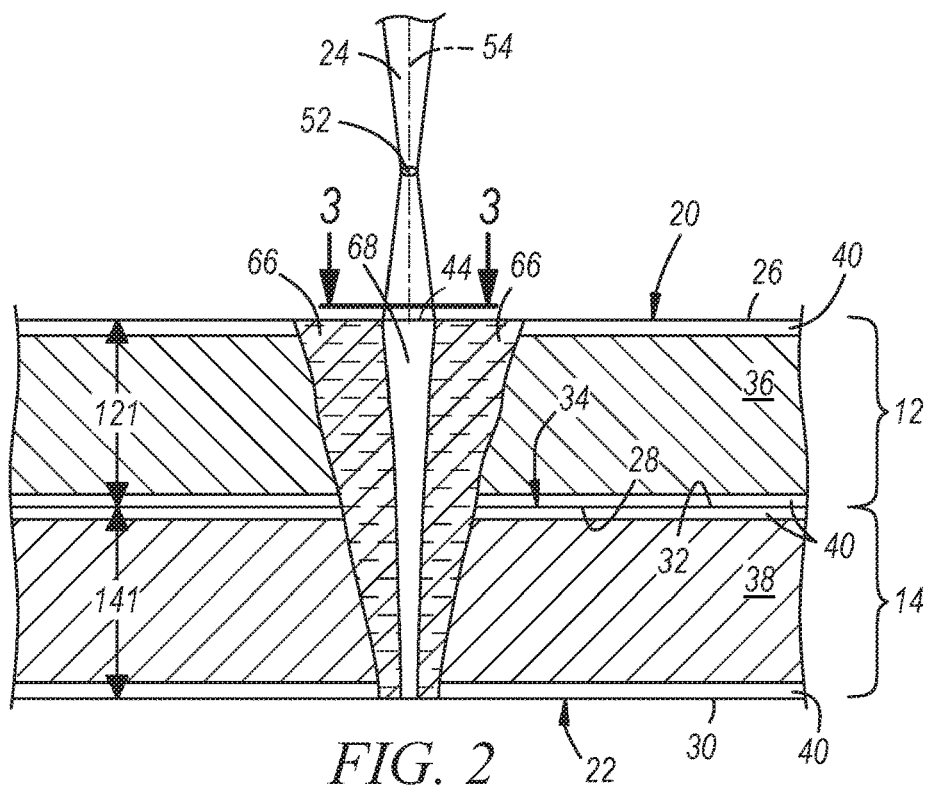
FIG. 2 is a cross-sectional side view of the workpiece stack-up depicted in FIG. 1 along with a molten metal weld pool and a keyhole produced by a laser beam, wherein both the molten metal weld pool and the keyhole fully penetrate the workpiece stack-up.

The workpiece stack-up 10 may include only the first and second metal workpieces 12, 14, as shown in FIGS. 1-2. Under these circumstances, and as shown best in FIG. 2, the first metal workpiece 12 includes an exterior outer surface 26 and a first faying surface 28, and the second metal workpiece 14 includes an exterior outer surface 30 and a second faying surface 32. The exterior outer surface 26 of the first metal workpiece 12 provides the top surface 20 of the workpiece stack-up 10 and the exterior outer surface 30 of the second metal workpiece 14 provides the oppositely-facing bottom surface 22 of the stack-up 10. And, since the two metal workpieces 12, 14 are the only workpieces present in the workpiece stack-up 10, the first and second faying surfaces 28, 32 of the first and second metal workpieces 12, 14 overlap and confront to establish a faying interface 34 that extends through the weld site 16. In other embodiments of the disclosed remote laser welding method, one of which is described below in connection with FIGS. 17-18, the workpiece stack-up 10 may include an additional metal workpiece disposed between the first and second metal workpieces 12, 14 to provide the stack-up 10 with three metal workpieces instead of two.

The term "faying interface" is used broadly in the present disclosure and is intended to encompass a wide range of overlapping relationships between the confronting first and second faying surfaces 28, 32 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a structural adhesive—and thus do not experience the type of interfacial abutment that typifies direct contact—yet are in close enough proximity that laser welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the faying surfaces 28, 32 spaced apart outside of and around the contact points by up to 1.0 mm and, preferably, between 0.2 mm and 0.8 mm.

As shown best in FIG. 2, the first metal workpiece 12 includes a first base metal substrate 36 and the second metal workpiece 14 includes a second base metal substrate 38. At least one of the first or second base metal substrates 36, 38—and possibly both—may include a surface coating 40. Here, in FIG. 2, each of the first and second base metal substrates 36, 38 is coated with a surface coating 40 that, in turn, provides the workpieces 12, 14 with their respective exterior outer surfaces 26, 30 and their respective faying surfaces 28, 32. In other embodiments, only the first base metal substrate 36 includes a surface coating 40 while the second base metal substrate 36 is uncoated or bare, or only the second base metal substrate 38 includes the surface coating 40 while the first base metal substrate 36 is uncoated or bare. The exact composition of the surface coating 40 depends largely on the metal composition of the underlying base metal substrate 36, 38. The surface coating(s) 40 may be employed on one or both of the base metal substrates 36, 38 for various reasons including corrosion protection, strength enhancement, and/or to improve processing, among other reasons. The first and second metal workpieces 12, 14 have thicknesses 121, 141 that may be the same or different from one another.

The first and second base metal substrates 36, 38 may be composed of steel or aluminum. If composed of steel, each of the base metal substrates 36, 38 (referred to for the moment as the first and second base steel substrates 36, 38) may be separately composed of any of a wide variety of steels including a low carbon (mild) steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when press-hardened steel (PHS) is included in the workpiece(s) 12, 14. Moreover, each of the first and second base steel substrates 36, 38 may have been treated to obtain a particular set of mechanical properties, including being subjected to heat-treatment processes such as annealing, quenching, and/or tempering. The first and second base steel substrates 36, 38 may be hot or cold rolled to their final thicknesses.

The surface coating 40 present on one or both of the base steel substrates 36, 38 is preferably comprised of a zinc-based material or an aluminum-based material. Some examples of a zinc-based material include zinc and a zinc alloy such as a zinc-nickel alloy or a zinc-iron alloy. Some examples of a suitable aluminum-based material include aluminum, an aluminum-silicon alloy, an aluminum-zinc alloy, and an aluminum-magnesium alloy. A coating of a zinc-based material may be applied by hot-dip galvanizing (zinc), electro-galvanizing (zinc), or galvannealing (zinc-iron alloy), typically to a thickness of 2 μm to 50 μm, and a coating of an aluminum-based material may be applied by dip coating, typically to a thickness of 2 μm to 30 μm, although other coating procedures and thicknesses of the attained coatings may be employed. Taking into the account the thicknesses of the base steel substrates 36, 38 and their surface coating(s) 40, if present, the overall thickness 121, 141 of each of the first and second steel workpieces 12, 14 preferably ranges from 0.4 mm to 4.0 mm or, more narrowly, from 0.5 mm to 2.0 mm, at least at the weld site 16.

If the first and second base metal substrates 36, 38 are composed of aluminum, each of the base metal substrates 36, 38 (referred to for the moment as the first and second base aluminum substrates 36, 38) may be separately composed of unalloyed aluminum or an aluminum alloy that includes at least 85 wt % aluminum. Some notable aluminum alloys that may constitute the first and/or second base aluminum substrates 36, 38 are an aluminum-magnesium alloy, an aluminum-silicon alloy, an aluminum-magnesium-silicon alloy, or an aluminum-zinc alloy. Additionally, each of the base aluminum substrates 36, 38 may be separately provided in wrought or cast form. For example, each of the base aluminum substrates 36, 38 may be composed of a 4xxx, 5xxx, 6xxx, or 7xxx series wrought aluminum alloy sheet layer, extrusion, forging, or other worked article. Or, as another example, each of the base aluminum substrates 36, 38 may be composed a 4xx.x, 5xx.x, or 7xx.x series aluminum alloy casting. Some more specific kinds of aluminum alloys that can be used as the first and/or second base aluminum substrates 36, 38 include, but are not limited to, AA5182 and AA5754 aluminum-magnesium alloy, AA6022 and AA6111 aluminum-magnesium-silicon alloy, AA7003 and AA7055 aluminum-zinc alloy, and Al-10Si-Mg aluminum die casting alloy. The first and/or second base aluminum substrates 36, 38 may be employed in a variety of tempers including annealed (O), strain hardened (H), and solution heat treated (T) depending on the desired properties of the workpieces 12, 14.

The surface coating 40 present on one or both of the base aluminum substrates 36, 38 may be a refractory oxide coating that forms passively when fresh aluminum from the base aluminum substrate 36, 38 is exposed to atmospheric air or some other oxygen-containing medium. Such a refractory oxide coating includes aluminum oxide compounds and possibly other metal oxide compounds as well. The surface coating 40 may also be a metallic coating comprised of zinc or tin, or it may be a metal oxide conversion coating comprised of oxides of titanium, zirconium, chromium, or silicon. A typical thickness of the surface coating 40, if present, lies anywhere from 1 nm to 10 μm depending on the composition of the coating 40 and the manner in which the coating 40 is derived, although other thicknesses may be employed. Taking into account the thicknesses of the base aluminum substrates 36, 38 and their surface coating(s) 40, if present, the overall thickness 121, 141 of each of the first and second aluminum workpieces 12, 14 preferably ranges of 0.3 mm to 6.0 mm or, more narrowly, from 0.5 mm to 3.0 mm, at least at the weld site 16.

Figure 3:
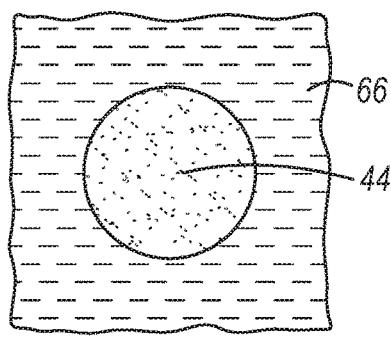
FIG. 3 is a sectional plan view (taken along section line 3-3 in FIG. 2) of a beam spot of the laser beam as projected onto a plane oriented along the top surface of the workpiece stack-up.

Referring back to FIG. 1, the remote laser welding apparatus 18 includes a scanning optic laser head 42. The scanning optic laser head 42 directs the laser beam 24 at the top surface 20 of the workpiece stack-up 10 which, here, is provided by the exterior outer surface 26 of the first metal workpiece 12. The directed laser beam 24 impinges the top surface 20 and, as shown in FIG. 3, has a beam spot 44, which is the sectional area of the laser beam 24 at a plane oriented along the top surface 20 of the stack-up 10. The scanning optic laser head 42 is preferably mounted to a robotic arm (not shown) that can quickly and accurately carry the laser head 42 to many different preselected weld sites 16 on the workpiece stack-up 10 in rapid programmed succession. The laser beam 24 used in conjunction with the scanning optic laser head 42 is preferably a solid-state laser beam operating with a wavelength in the near-infrared range (commonly considered to be 700 nm to 1400 nm) of the electromagnetic spectrum. Additionally, the laser beam 24 can attain a power density sufficient to produce a keyhole, if desired, within the workpiece stack-up 10 during formation of the laser weld joint. The power density needed to produce a keyhole within the overlapping metal workpieces is typically in the range of 0.5-1.5 MW/cm$^2$.

Some examples of a suitable solid-state laser beam that may be used in conjunction with the remote laser welding apparatus 18 include a fiber laser beam, a disk laser beam, and a direct diode laser beam. Each of those types of lasers is commercially available. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS). Other solid-state laser beams not specifically mentioned here may of course be used.

The scanning optic laser head 42 includes an arrangement of mirrors 46 that can maneuver the laser beam 24 and translate the beam spot 44 along the top surface 20 of the workpiece stack-up 10 within an operating envelope 48 that encompasses the weld site 16. Here, as illustrated in FIG. 1, the portion of the top surface 20 spanned by the operating envelope 48 is labeled the x-y plane since the position of the laser beam 24 within the plane is identified by the "x" and "y" coordinates of a three-dimensional coordinate system. In addition to the arrangement of mirrors 46, the scanning optic laser head 42 also includes a z-axis focal lens 50, which can move a focal point 52 (FIG. 2) of the laser beam 24 along a longitudinal axis 54 of the laser beam 24 to thus vary the location of the focal point 52 in a z-direction that is oriented perpendicular to the x-y plane in the three-dimensional coordinate system established in FIG. 1. Furthermore, to keep dirt and debris from adversely affecting the optical system components and the integrity of the laser beam 24, a cover slide 56 may be situated below the scanning optic laser head 42. The cover slide 56 protects the arrangement of mirrors 46 and the z-axis focal lens 50 from the surrounding environment yet allows the laser beam 24 to pass out of the scanning optic laser head 42 without substantial disruption.

The arrangement of mirrors 46 and the z-axis focal lens 50 cooperate during operation of the remote laser welding apparatus 18 to dictate the desired movement of the laser beam 24 and its beam spot 44 within the operating envelope 48 at the weld site 16 as well as the position of the focal point 52 along the longitudinal axis 54 of the laser beam 24. The arrangement of mirrors 46, more specifically, includes a pair of tiltable scanning mirrors 58. Each of the tiltable scanning mirrors 58 is mounted on a galvanometer 60. The two tiltable scanning mirrors 58 can move the location of the beam spot 44—and thus change the point at which the laser beam 24 impinges the top surface 20 of the workpiece stack-up 10—anywhere in the x-y plane of the operating envelope 48 through precise coordinated tilting movements executed by the galvanometers 60. At the same time, the z-axis focal lens 50 controls the location of the focal point 52 of the laser beam 24 as desired. All of these optical components 50, 58 can be rapidly indexed in a matter of milliseconds or less with the help of programmable controllers to maneuver the laser beam 24 within the operating envelope 48 while controlling the location of the focal point 52. This allows the focal point 52 of the laser beam 24 to be moved very rapidly and with a high degree of precision through the space of the three-dimensional x-y-z coordinate system in almost any desired spatial sequence.

A characteristic that differentiates remote laser welding (also sometimes referred to as "welding on the fly") from other conventional forms of laser welding is the focal length of the laser beam 24. Here, as shown in best in FIG. 1, the laser beam 24 has a focal length 62, which is measured as the distance between the focal point 52 and the last tiltable scanning mirror 58 that intercepts and reflects the laser beam 24 prior to the laser beam 24 impinging the top surface 20 of the workpiece stack-up 10 (also the exterior outer surface 26 of the first metal workpiece 12). The focal length 62 of the laser beam 24 is preferably in the range of 0.4 meters to 2.0 meters with a diameter of the focal point 52 typically ranging anywhere from 350 µm to 700 µm. The scanning optic laser head 42 shown generally in FIG. 1 and described above, as well as others that may be constructed somewhat differently, are commercially available from a variety of sources. Some notable suppliers of scanning optic laser heads and lasers for use with the remote laser welding apparatus 18 include HIGHYAG (Kleinmachnow, Germany) and TRUMPF Inc. (Farmington, Conn., USA).

Figure 16:
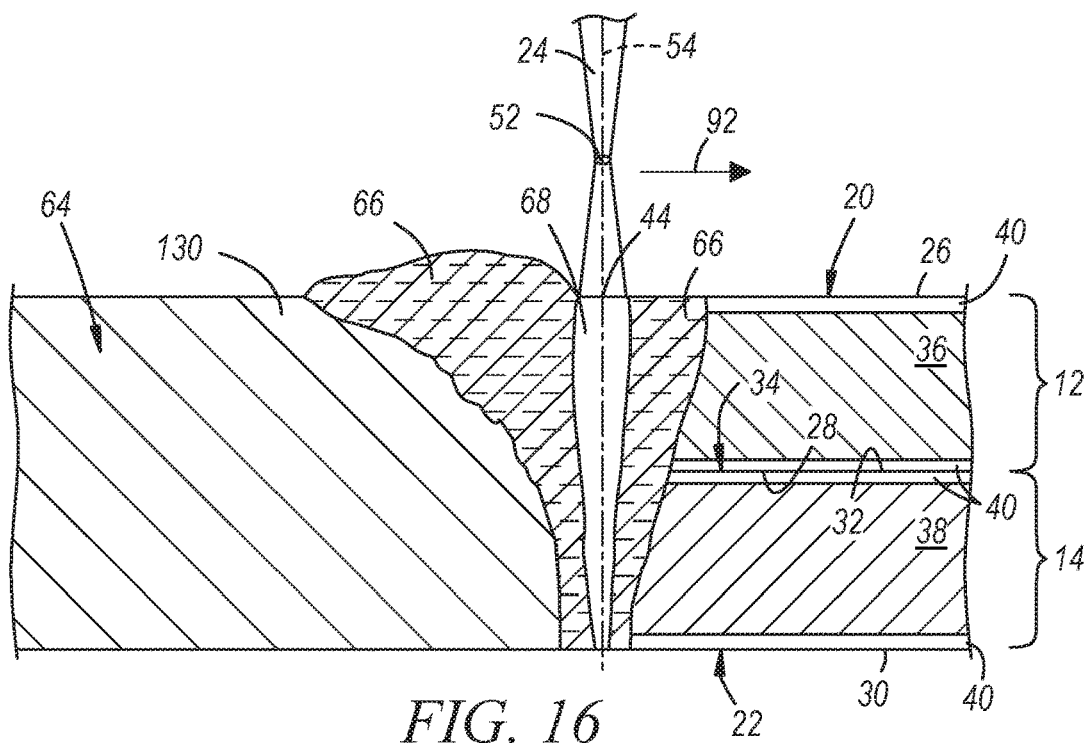
FIG. 16 is a cross-sectional side view of the workpiece stack-up taken from the same perspective as FIG. 2 showing translation of the molten metal weld pool through the workpiece stack-up as a result of advancement of the beam spot of the laser beam relative to the top surface of the stack-up, and wherein both the molten metal weld pool and the keyhole fully penetrate the workpiece stack-up.
Figure 17:
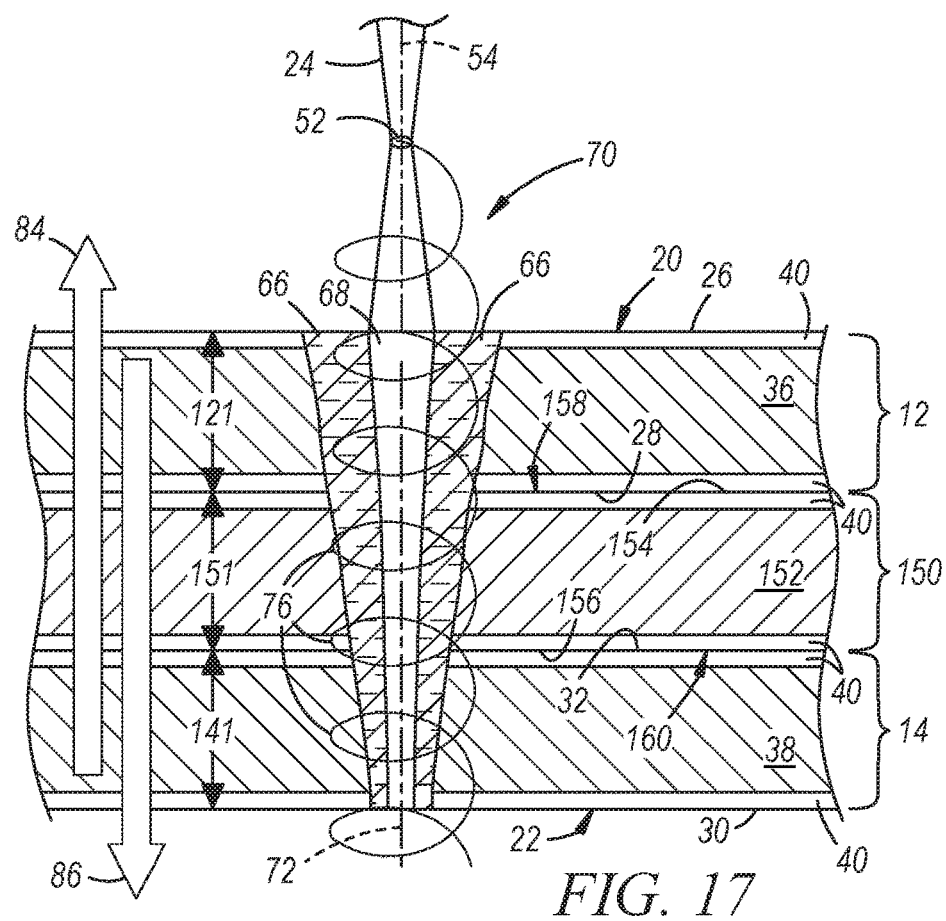
FIG. 17 is a cross-sectional side view of the workpiece stack-up taken from the same perspective as shown in FIG. 2, although here the workpiece stack-up includes three metal workpieces that establish two faying interfaces, as opposed to two metal workpieces that establish a single faying interface as depicted in FIG. 2.
Figure 18:
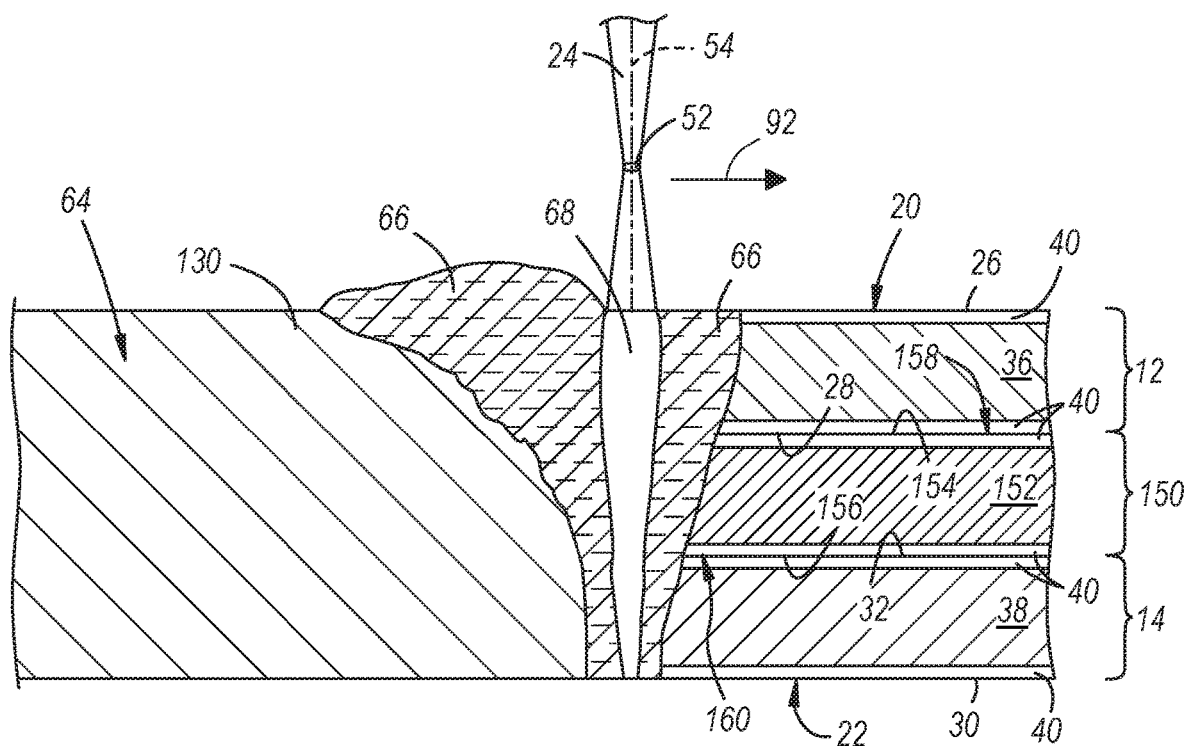
FIG. 18 is a cross-sectional side view of the workpiece stack-up taken from the same perspective as FIG. 16 showing translation of the molten metal weld pool through the workpiece stack-up as a result of advancement of the beam spot of the laser beam relative to the top surface of the stack-up, and wherein both the molten metal weld pool and the keyhole fully penetrate the workpiece stack-up, although here the workpiece stack-up includes three metal workpieces that establish two faying interfaces, as opposed to two metal workpieces that establish a single faying interface as depicted in FIG. 16.

In the presently disclosed laser welding method, as illustrated generally in FIG. 1-18, a laser weld joint 64 (FIGS. 1, 16, and 18) is formed within the workpiece stack-up 10 and between the first and second metal workpieces 12, 14 (or the first, second, and third metal workpieces as illustrated in FIGS. 17-18 and described below) by momentarily melting the metal workpieces 12, 14 with the laser beam 24 while maneuvering the laser beam 24 in a rather sophisticated fashion. To begin, the workpiece stack-up 10 is provided, which typically involves assembling or fitting the first and second metal workpieces 12, 14 together with overlapping flanges or other bonding regions. Once the workpiece stack-up 10 is provided, the laser beam 24 is directed at, and impinges, the top surface 20 of the stack-up 10 within the weld site 16, thus establishing the beam spot 44 where laser energy enters the stack-up 10. The heat generated from absorption of the focused energy of the laser beam 24 initiates melting of the first and second metal workpieces 12, 14 to create a molten metal weld pool 66 that penetrates into the workpiece stack-up 10 from the top surface 20 towards the bottom surface 22, as shown best in FIG. 2. The molten metal weld pool 66 penetrates far enough into the workpiece stack-up 10 at some point during the duration of the laser welding method that it intersects the faying interface 34 established between the first and second steel workpieces 12, 14.

The laser beam 24, moreover, preferably has a power density sufficient to vaporize the workpiece stack-up 10 directly beneath the beam spot 44. This vaporizing action produces a keyhole 68, which is a column of vaporized workpiece metal that usually contains plasma. The keyhole 68 is formed within the molten metal weld pool 66 and exerts an outwardly-directed vapor pressure sufficient to prevent the surrounding molten metal weld pool 66 from collapsing inward. And, like the molten metal weld pool 66, the keyhole 68 also penetrates into the workpiece stack-up 10 from the top surface 20 towards the bottom surface 22 and, at some point during the duration of the laser welding method, penetrates far enough into the stack-up 10 that it intersects the faying interface 34 established between the first and second metal workpieces 12, 14. The keyhole 68 provides a conduit for the laser beam 24 to deliver energy down into the workpiece stack-up 10, thus facilitating relatively deep and narrow penetration of the molten metal weld pool 66 into the workpiece stack-up 10 and a relatively small surrounding heat-affected zone. The molten metal weld pool 66 and the keyhole 78 may fully (FIG. 2) or partially (FIG. 2A) penetrate the workpiece stack-up 10.

Figure 4:
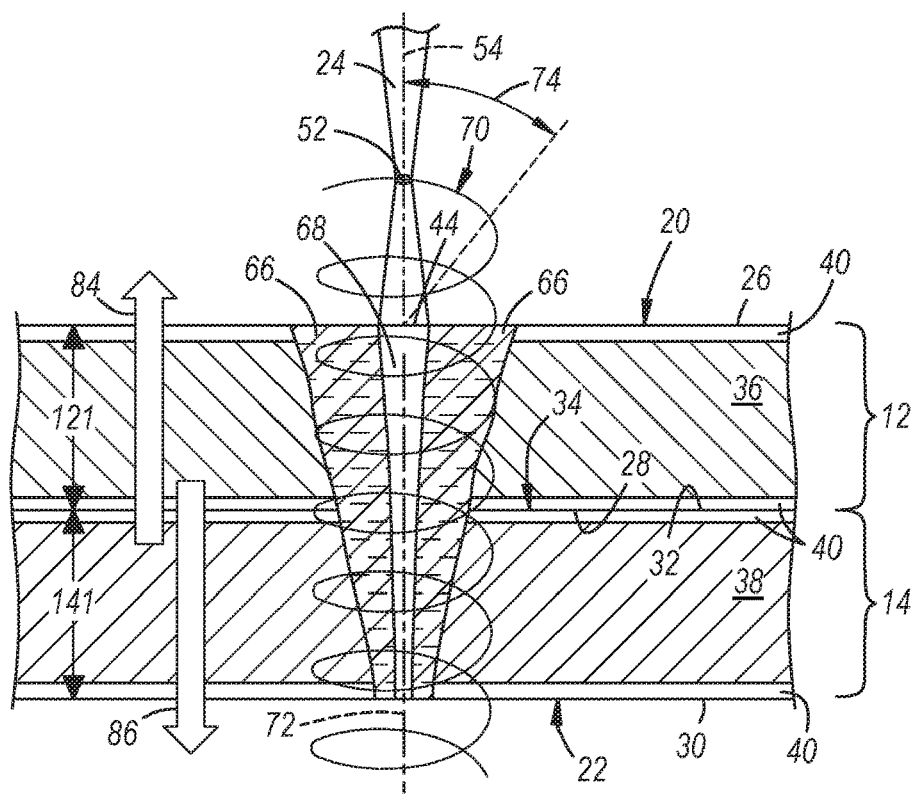
FIG. 4 is a cross-sectional view of the workpiece stack-up that illustrates a representative helical path along which a focal point of the laser beam is moved during gyration of the laser beam according to one embodiment of the disclosed laser welding method.
Figure 5:
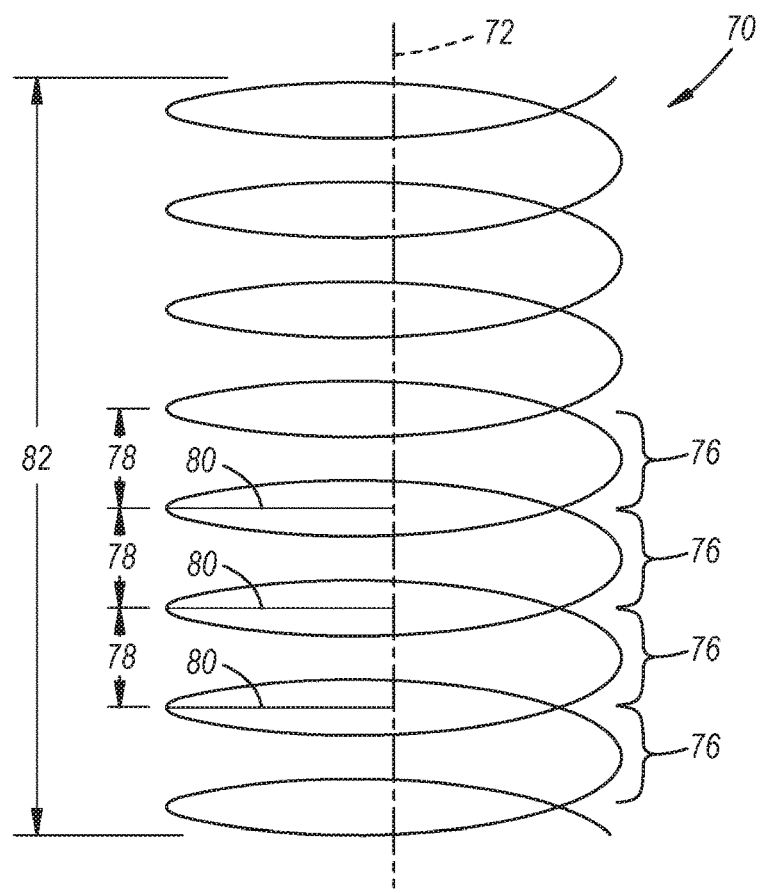
FIG. 5 is a side perspective view of a cylindrical helical path along which a focal point of the laser beam is moved during gyration of the laser beam according to one embodiment of the disclosed laser welding method.

Referring now specifically to FIGS. 4-5, as soon as the laser beam 24 impinges the top surface 20 of the workpiece stack-up 10, or soon thereafter, the laser beam 24 is gyrated to move the focal point 52 of the beam 24 along at least one helical path 70 having a central helix axis 72 oriented transverse to the top and bottom surfaces 20, 22 of the workpiece stack-up 10. The central helix axis 72 is oriented transverse to the top and bottom surfaces 20, 22 of the workpiece stack-up 10 when it intersects or can be extrapolated collinearly to intersect each of those surfaces 20, 22. The intersection of the central helix axis 72 or its collinear extrapolation may be normal to the top and bottom surfaces 20, 22 of the workpiece stack-up 10, as shown in FIG. 4, although such strict perpendicularity is not necessarily required. Indeed, as is also shown in FIG. 4, the central helix axis 72 or its collinear extrapolation may intersect the top and bottom surfaces 20, 22 of the workpiece stack-up 10 at an angle 74 that deviates from perpendicularity by up to 45°. The gyration of the laser beam 24 as needed to move the focal point 52 along the helical path 70 is managed by precisely controlling the coordinated movements of the tiltable scanning mirrors 58 and the z-axis focal lens 50 of the scanning optic laser head 42.

The movement of the focal point 52 along the helical path 70 results in the focal point 52 being wound around the central helix axis 72 along a plurality of turnings 76. Each of the turnings 76 has a pitch 78 measured parallel to the central helix axis 72 as well as a radius 80 measured perpendicular to the central helix axis 72. The pitch 78 of each turning 76 preferably ranges from 10 µm to 5000 µm, with the pitches 78 of the several turnings 76 all being the same or, alternatively, exhibiting some variability. The radius 80 of each turning 76 preferably ranges from 50 µm to 20 mm and may be constant or variable (e.g., increasing or decreasing) as it encircles the central helix axis 72. The number of turnings 76 that constitute the helical path 70 may vary from a few to many, but, in many instances, anywhere from two to two hundred turnings 76 may be tracked by the focal point 52. And, depending on the number of turnings 76 in the helical path 70 and the pitch 78 of each of those turnings 76, the helical path 70 has a length 82 along the central helix axis 72 that preferably ranges from 0.5 mm to 30 mm.

The gyration of the laser beam 24 to move the focal point 52 along the plurality of turnings 76 causes the focal point 52 to be conveyed along the helical path 70 in an overall axial direction. The term "overall axial direction" refers to the component of the movement of the focal point 52 parallel to the central helix axis 72. Depending on the way in which the focal point 52 is moved around the plurality of turnings 76, the focal point 52 may be conveyed in a positive overall axial direction 84 or a negative overall axial direction 86 (FIG. 4). These two overall axial directions 84, 86 are pointed in opposite yet aligned directions with the positive overall axial direction 84 representing conveyance towards the scanning optic laser head 42 (i.e., the position of the focal point 52 in the z-direction is becoming more positive (+)) and the negative overall axial direction 86 representing conveyance away from the scanning optic laser head 42 (i.e., the position of the focal point 52 in the z-direction is becoming more negative (−)). The movement of the focal point 52 of the laser beam 24 along the multitude of turnings 76 of the helical path 70 to ultimately convey the focal point 52 in either the positive overall axial direction 84 or the negative overall axial direction 86 may occur at a speed that ranges from 0.1 meters per minute (m/min) to 100 m/min.

The helical path 70 along which the focal point 52 moves may pass through the workpiece stack-up 10 as shown in FIG. 4. In this way, the length 82 of the helical path 70 is greater than the combined thickness of the first and second metal workpieces 12, 14 at the weld site 16, and the helical path 70 followed by the focal point 52 extends entirely through the first and second metal workpieces 12, 14. Other arrangements of the helical path 70 besides that shown here in FIG. 4 are of course possible. In other embodiments, for instance, the helical path 70 may be fully contained within the workpiece stack-up 10 or it may partially pass through either the first metal workpiece 12 or the second metal workpiece 14. Additionally, in still other embodiments, the helical path 70 may be positioned above the top surface 20 of the workpiece stack-up 10 or below the bottom surface 22 and, thus, unlike the embodiments discussed above, may not encroach upon the workpiece stack-up 10 at all. Regardless of where the helical path 70 is positioned relative to the workpiece stack-up 10, the movement of the focal point 52 of the laser beam 24 is preferably performed within a space that extends from 100 mm above the top surface 20 of the workpiece stack-up 10 to 100 mm below the bottom surface 22.

The helical path 70 followed by the focal point 52 of the laser beam 24 may assume a variety of geometric configurations. For instance, as shown here in FIGS. 4-5, the helical path 70 may be a cylindrical helical path. In a cylindrical helical path, the radius 80 of each of the turnings 76 is constant along the length 82 of the helical path 70 from one end of the path 70 to the other end. In that sense, the radius 80 of each of the turnings 76 of the cylindrical helical path is the same. A cylindrical helical path of radius (r) and pitch (b/r) may be mathematically represented by the following parametric equations:

$$x(t) = r\cos(t)$$

$$y(t) = r\sin(t)$$

$$z(t) = bt$$

Figure 6:
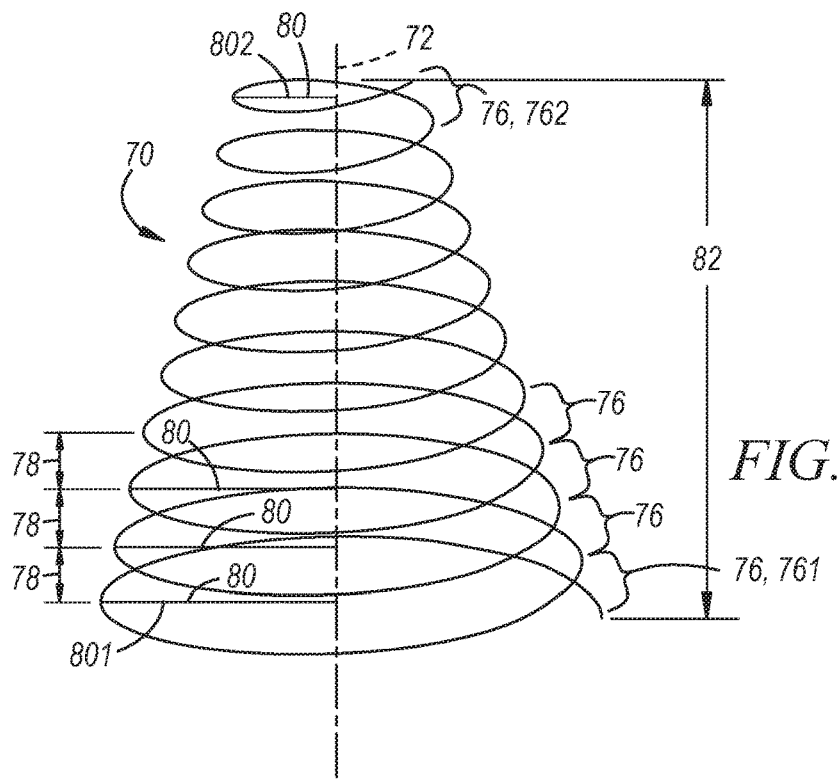
FIG. 6 is a side perspective view of a conical helical path along which a focal point of the laser beam is moved during gyration of the laser beam according to one embodiment of the disclosed laser welding method.

In another exemplary embodiment, as shown in FIG. 6, the helical path 70 may be a conical helical path. In a conical helical path, the radius 80 of each of the turnings 76 decreases regularly along the length 80 of the helical path 70 from a turning 76₁ with a maximum radius 80₁ at one end of the path 70 to a turning 76₂ with a minimum radius 80₂ at the other end. A conical helical path with an angular frequency (a), a height (h), and a radius (r) that decreases with height (h) may be mathematically represented by the following parametric equations:

$$x = \frac{(h-z)}{h}r\cos(az)$$

$$y = \frac{(h-z)}{h}r\sin(az)$$

$$z = z$$

Figure 7:
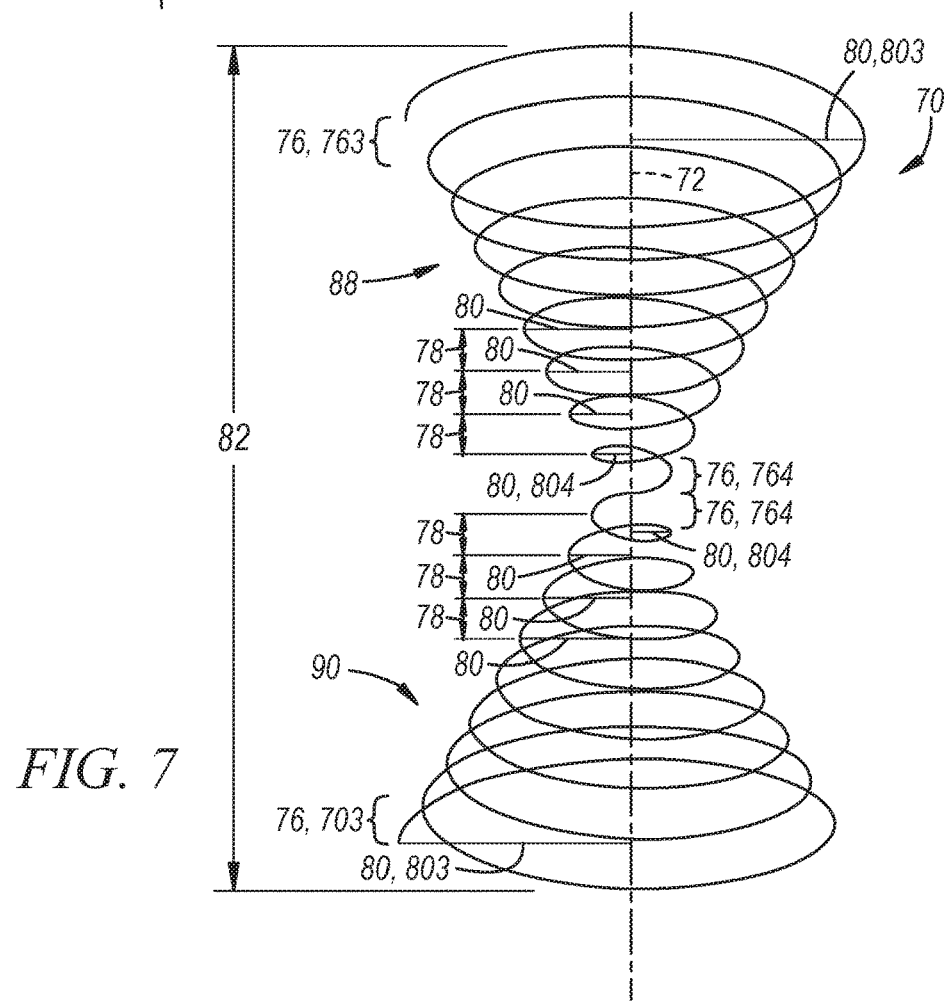
FIG. 7 is a side perspective view of a helical path, which includes an upper conical helical portion and a lower conical helical portion, and along which a focal point of the laser beam is moved during gyration of the laser beam according to one embodiment of the disclosed laser welding method.

In addition to the cylindrical and conical helical paths just described, the helical path 70 may also be a combination of two or more helical portions of the same or different geometric configuration. For example, as shown in FIG. 7, the helical path 70 may include an upper conical helical portion 88 and a lower conical helical portion 90. The radii 80 of each of the turnings 76 of the upper conical helical portion 88 and the lower conical helical portion 90 decreases along the length 82 of the helical path 70 towards each other. More specifically, the radius 80 of each of the turnings 76 of the upper conical helical portion 88 and the radius 80 of each of the turnings 76 of the lower conical helical portion 90 decrease regularly in converging directions along the length 82 of the helical path 70 from a turning 76₃ with a maximum radius 80₃ at one end of the conical helical portions 88, 90 to a turning 76₄ with a minimum radius 80₄ at the other end of the conical helical portions 88, 90. The turnings 76₄ of each of the upper and lower conical helical portions 88, 90 defined by the minimum radii 80₄ are adjacently situated along the central helix axis 72 while the turnings 76₃ defined by the maximum radii 80₃ are spaced apart by a distance equal to the length 82 of the helical path 70.

The laser beam 24 may be gyrated to move the focal point 52 along a single helical path 70 or a plurality of helical paths 70 when forming the laser weld joint 64. In one implementation of the disclosed laser welding method, the plurality of turnings 76 has a maximum radius, which essentially corresponds to the radius 80 of the largest turning 76, that is large enough to cause the beam spot 44 of the laser beam 24 to be advanced relative to the top surface 20 of the workpiece stack-up 10 in a two-dimensional course that reflects the movement of the focal point 52 along the helical path 70. In other words, the beam spot 44 of the laser beam 24 is advanced along a two-dimensional projection of the helical path 70 onto the top surface 20 as a consequence of moving the focal point 52 along the helical path 70. A maximum radius of the plurality of turnings 76 that is greater than 2 mm, or more specifically between 2 mm and 20 mm, is typically sufficient to cause noticeable advancement of the beam spot 44 along the top surface 20 of the workpiece stack-up 10 and to melt enough of the first and second metal workpieces 12, 14 that a laser weld joint 64 of suitable size can be obtained by moving the focal point 52 of the laser beam 24 along just a single helical path 70.

The gyration of the laser beam 24 to move the focal point 52 along a single helical path 70—either in the positive overall axial direction 84 or the negative overall axial direction 86—during formation of the laser weld joint 64 can be practiced using a variety of geometric configurations for the helical path. For example, the helical path 70 may be a cylindrical helical path (e.g., FIGS. 4-5) such that movement of the focal point 52 along the cylindrical helical path (in either overall axial direction) results in the beam spot 44 being advanced repeatedly in a common defined circular course on the top surface 20 of the workpiece stack-up 10. In this example, the maximum radius of the plurality of turnings 76 is equal to the constant radius 80 of each individual turning 76, which is also equal to the radius of the resultant circular course traced by the beam spot 44 on the top surface 20. As another example, the helical path 70 may be a conical helical path (e.g., FIG. 6) such that movement of the focal point 52 along the conical helical path (in either overall axial direction) results in the beam spot 44 being advanced in a defined spiral course on the top surface 20 of the workpiece stack-up 10. In this example, the maximum radius of the plurality of turnings 76 is equal to the radius 80₁ of the largest turning 76₁, which is also equal to the radius of the perimeter of the resultant spiral course traced by the beam spot 44 on the top surface 20.

The focal point 52 of the laser beam 24 may of course be moved along a plurality of helical paths 70, one after another, even though the maximum diameter of the helical path 70 is large enough to cause the beam spot 44 to be advanced in a reflected two-dimensional course along the top surface 20 of the workpiece stack-up 10. In this way, the laser beam 24 may be gyrated to move the focal point 52 of the laser beam 24 along a first helical path 70 to convey the focal point 52 in a first overall axial direction, which may be either the positive or negative overall axial direction 84, 86, and to then move the focal point 52 along a second helical path 70 to convey the focal point 52 in a second overall axial direction opposite to the first overall axial direction (i.e., the other of the positive or negative overall axial direction 84, 86). Such gyration of the laser beam 24 thus results in the focal point 52 of the laser beam 24 being alternately conveyed in opposite overall axial directions along a first helical path and a second helical path. Moreover, if desired, the focal point 52 of the laser beam 24 may be moved along additional helical paths (i.e., a third helical path, a forth helical path, and so on) so as to alternately convey the focal point 52 back-and-forth in opposite overall axial directions while moving the focal point 52 along the several different helical paths 70. If a plurality of helical paths 70 is employed, each of the helical paths may be the same or different in terms of size and geometric configuration.

In some instances, such as when the maximum radius of the plurality of turnings 76 of the helical path 70 is less than 2 mm, or more specifically between 50 µm and 2 mm, the movement of focal point 52 of the laser beam 24 along the helical path 70 may not melt enough of the first and second metal workpieces 12, 14 to provide the laser weld joint 64 with an adequate size. Under these circumstances, the laser beam 24, and thus the beam spot 44, may additionally be advanced in a mean forward direction 92 along a beam travel pattern 94 relative to the top surface 20 of the workpiece stack-up 10 in order to obtain a laser weld joint 64 of sufficient size, as shown generally in FIG. 8. In particular, the laser beam 24 is advanced relative to the top surface 20 of the workpiece stack-up 10 while being gyrated to move the focal point 52 along a plurality of helical paths 70 so as to alternately convey the focal point 52 back-and-forth in opposite overall axial directions as the laser beam 24 is progressing along the travel pattern 94, as illustrated generally in FIGS. 8-9. Each of the plurality of helical paths 70 is displaced from an adjacent, previously-followed helical path in the direction of the forward advancement of the beam spot 44 along the mean forward direction 92. The helical paths 70 along which the focal point 52 is moved may or may not overlap with one another.

Figure 8:
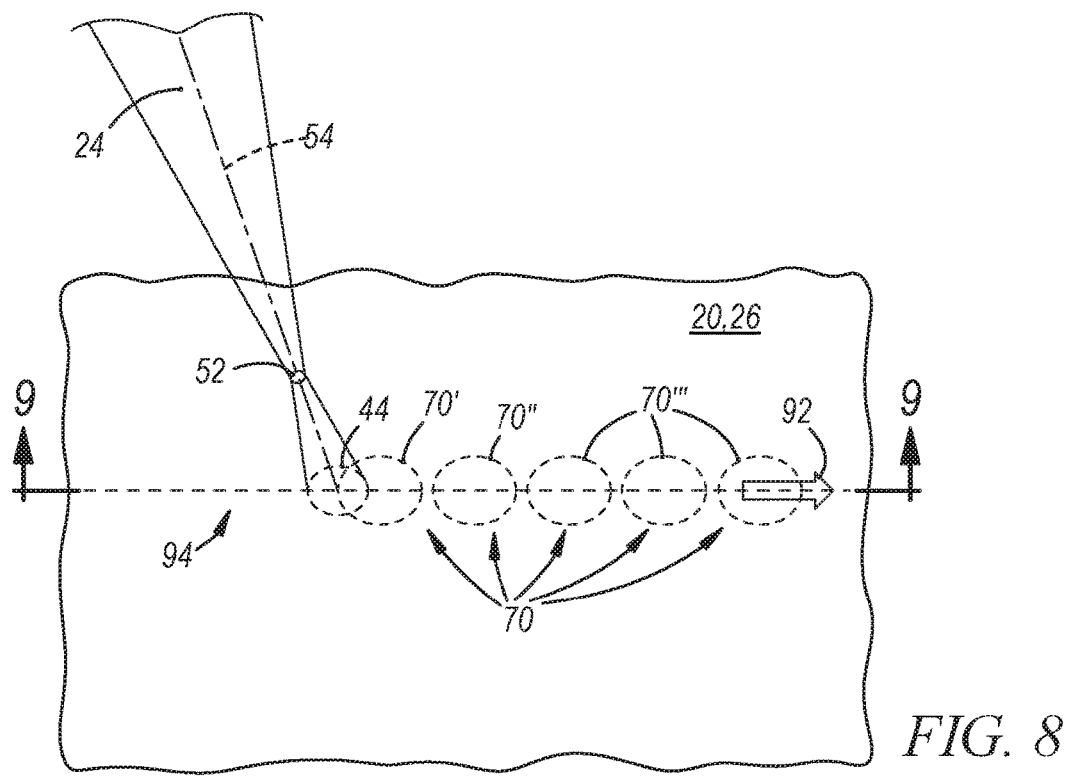
FIG. 8 is a generic representative depiction of a beam travel pattern as projected onto the top surface of the workpiece stack-up that, in one embodiment of the laser welding method, may be traced by the laser beam while the laser beam is being gyrated to move the focal point of the beam along a plurality of helical paths so as to alternately convey the focal point back-and-forth in opposite overall axial directions as the laser beam is progressing along the travel pattern.
Figure 9:
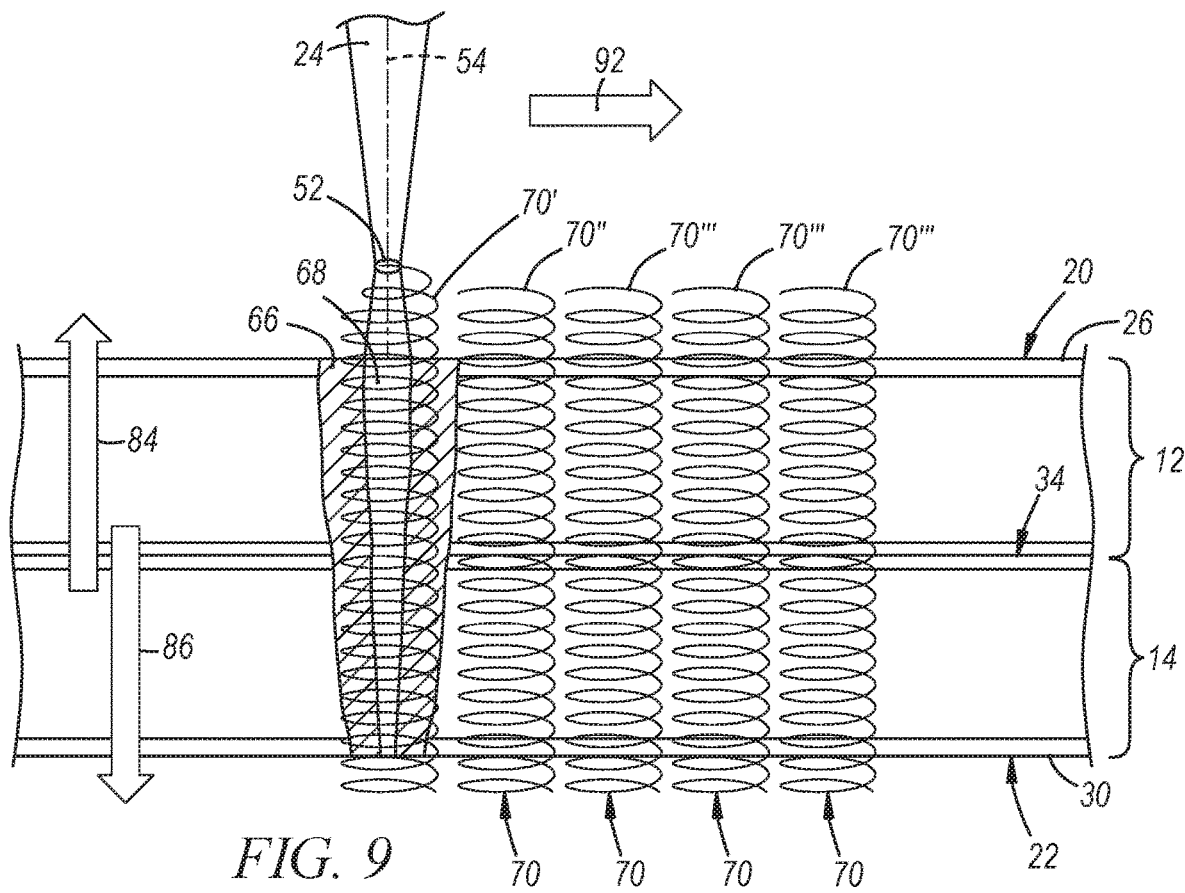
FIG. 9 is a cross-sectional view (taken along section line 9-9 in FIG. 8) of the generic representative depiction of the beam travel pattern of FIG. 8.
Figure 10:
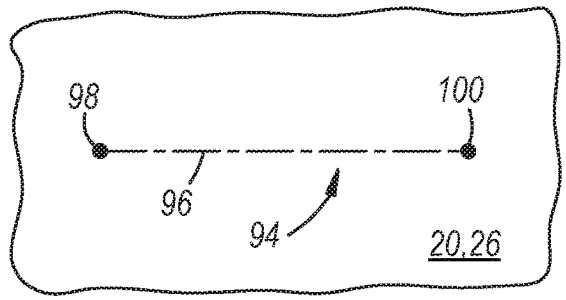
FIG. 10 depicts an embodiment of a beam travel pattern as projected onto the top surface of the workpiece stack-up that may be traced by the laser beam during formation of a laser weld joint between the two or more overlapping metal workpieces included in the workpiece stack-up.
Figure 11:
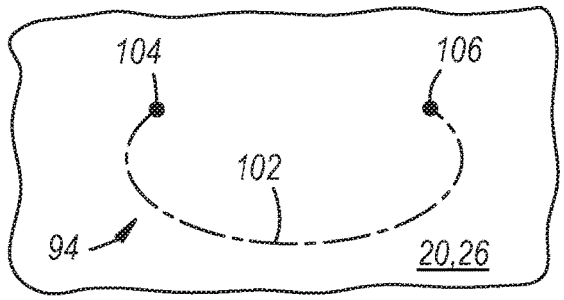
FIG. 11 depicts another embodiment of the beam travel pattern as projected onto the top surface of the workpiece stack-up that may be traced by the laser beam during formation of a laser weld joint between the two or more overlapping metal workpieces included in the workpiece stack-up.

As shown in FIGS. 8-9, the laser beam 24 may be gyrated to move the focal point 52 of the laser beam 24 along a first helical path 70' to convey the focal point 52 in a first overall axial direction, which may be either the positive or negative overall axial direction 84, 86, and to then move the focal point 52 along a second helical path 70" to convey the focal point in a second overall axial direction opposite to the first overall axial direction (i.e., the other of the positive or negative overall axial direction 84, 86). Such movement of the focal point 52 may continue along many additional helical paths 70''' to further alternately convey the focal point 52 back-and-forth in opposed overall axial directions while advancing the laser beam 24 in the mean forward direction 92 along the beam travel pattern 94 on the top surface 20 of the stack-up 10. Anywhere from 10 to 500 helical paths 70 may be followed by the focal point 52 of the laser beam 24 depending on a variety of factors including the shape of the beam travel pattern 94 and the maximum radius of the plurality of turnings 76 of each helical path 70. The sizes and geometric configurations of the many different helical paths 70 that make up the plurality of helical paths 70 may be similar or dissimilar from one another.

The beam travel pattern 94 traced by the laser beam 24 along the top surface 20 of the workpiece stack-up 10 may be any of a wide variety of patterns. Several exemplary beam travel patterns 94 are shown here from the perspective of a two-dimensional plan view of the top surface 20 of the workpiece stack-up 10. For instance, and referring now to FIGS. 10-15, the beam travel pattern 94 may be a linear stitch pattern (FIG. 10), a curved or "C-shaped" staple pattern (FIG. 11), a circle pattern (FIG. 12), an elliptical pattern (FIG. 13), a spiral pattern (FIG. 14), or an oscillating pattern (FIG. 15), among others. In the linear stitch pattern of FIG. 10, the beam spot 44 of the laser beam 24 is advanced along a linear weld path 96 from a start point 98 to an end point 100. Likewise, in the staple pattern of FIG. 11, the beam spot 44 of the laser beam 24 is advanced along a curved and circumferentially open weld path 102 from a start point 104 to an end point 106. The curved and circumferentially open weld path 102 may be semi-circular or semi-elliptical in shape.

Figure 12:
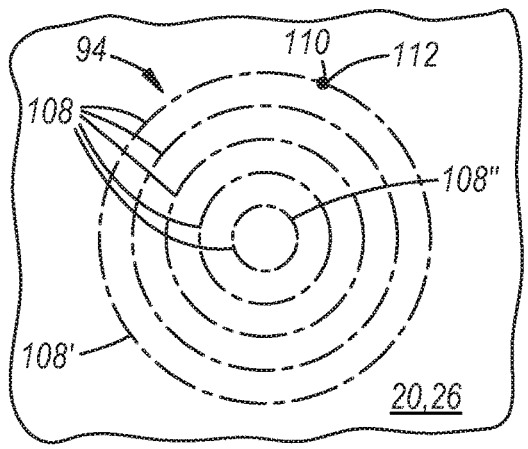
FIG. 12 depicts yet another embodiment of the beam travel pattern as projected onto the top surface of the workpiece stack-up that may be traced by the laser beam during formation of a laser weld joint between the two or more overlapping metal workpieces included in the workpiece stack-up.
Figure 13:
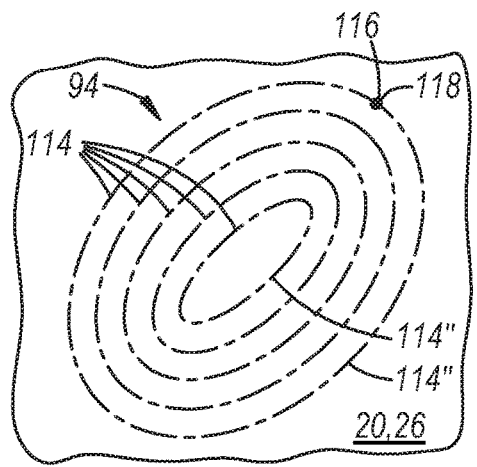
FIG. 13 depicts still another embodiment of the beam travel pattern as projected onto the top surface of the workpiece stack-up that may be traced by the laser beam during formation of a laser weld joint between the two or more overlapping metal workpieces included in the workpiece stack-up.

In the circle pattern of FIG. 12, the beam spot 44 of laser beam 24 is advanced along one or more circular weld paths 108 from a start point 110 to an end point 112 (shown only on one of the illustrated circular weld paths 108). The start point 110 and the end point 112 of the circular weld path(s) may be the same or, alternatively, they may be different. Moreover, if the circle pattern includes a series of radially-spaced and unconnected circular weld paths 108, as shown in FIG. 12, the number of circular weld paths 108 may range from two to twenty. In that regard, the series of circular weld paths 108 includes an outermost circular weld path 108' and an innermost circular weld path 108", and all of the weld paths 108 in between may be evenly spaced apart or they may be spaced apart at varying distances. Regardless of the uniformity in spacing or lack thereof, the distance between radially-aligned points on each pair of adjacent circular weld paths 108 preferably lies between 0.01 mm and 0.8 mm. The elliptical pattern shown in FIG. 13 is similar in all material respects to the circular pattern shown in FIG. 12, including the number and spacing of the weld paths, except for the fact that the beam spot 44 of the laser beam 24 is advanced along one or more elliptical weld paths 114 from a start point 116 to an end point 118 as opposed to one or more circular weld paths.

Figure 14:
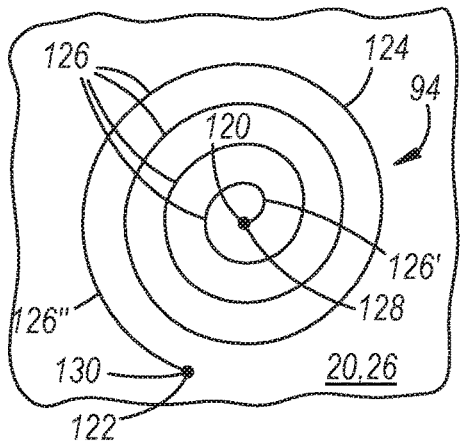
FIG. 14 depicts another embodiment of the beam travel pattern as projected onto the top surface of the workpiece stack-up that may be traced by the laser beam during formation of a laser weld joint between the two or more overlapping metal workpieces included in the workpiece stack-up.

In the spiral pattern of FIG. 14, the beam spot 44 of the laser beam 24 is advanced from a start point 120 to an end point 122 along a single spiral weld path 124 that revolves around itself and expands radially outwardly in doing so, and that further includes from two to twenty turnings 126. The start point 120 of the spiral weld path 124 may be an interior point 128 of the innermost turning 126' of the weld path 124, and the end point 122 may be an exterior point 130 of the outermost turning 126" of the weld path 124, or vice versa. The spiral weld path 124 may be continuously curved, as shown in FIG. 14, and the spiral pattern may further be an Archimedean spiral in which the turnings 126 of the weld path 124 are spaced equidistantly from each other. This distance may range from 0.01 mm and 0.8 mm as measured between radially-aligned points on each pair of adjacent turnings 126. Alternatively, as another example, the spiral weld path 124 may be arranged into an equiangular spiral pattern in which adjacent turnings 126 of the weld path 124 get progressively farther apart. One example of an equiangular spiral pattern is defined by the equation $r(\theta)=e^{-0.1(\theta)}$ in which theta is defined in polar coordinates.

Figure 15:
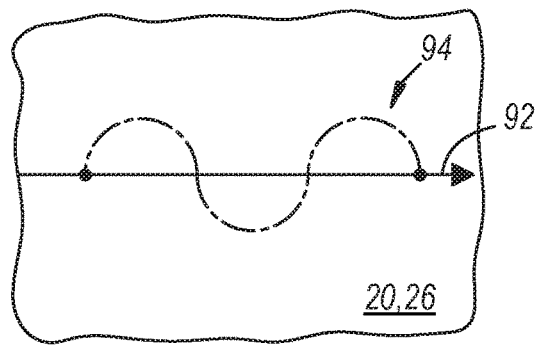
FIG. 15 depicts still another embodiment of the beam travel pattern as projected onto the top surface of the workpiece stack-up that may be traced by the laser beam during formation of a laser weld joint between the two or more overlapping metal workpieces included in the workpiece stack-up.

Other embodiments of the beam travel pattern 94 are indeed contemplated in addition to those shown in FIGS. 10-14. In one such other embodiment, which is depicted in FIG. 15, the beam spot 44 of the laser beam 24 may be advanced along any of the patterns shown in FIGS. 10-14, plus others not shown, while oscillating back and forth in a direction transverse to the mean forward direction 92 of the beam spot 44. For example, the beam spot 44 may be oscillated back-and-forth along the top surface 20 of the workpiece stack-up 10 as it travels in the mean forward direction 92 along the linear weld path 96 shown in FIG. 10, the curved and circumferentially open weld path 102 shown in FIG. 11, the one or more circular/elliptical weld paths 108, 114 shown in FIGS. 12-13, or the single spiral weld path 124 shown in FIG. 14. The back-and-forth oscillations of the beam spot 44 may be sinusoidal, as shown, but can also be zig-zag or rectangular or some other shape. In terms of the size and spacing of the back-and-forth oscillations, both the peak-to-peak amplitude and the wavelength of the transverse deviations of the beam spot 44 preferably range from 0.1 mm to 6.0 mm as the beam spot 44 is moving in the mean forward direction 92 along the beam travel pattern 94.

Referring now to FIG. 16, as the beam spot 44 of the laser beam 24 is being advanced along the top surface 20 of the workpiece stack-up 10, either as a consequence of the size and shape of the helical path 70 itself or as a result of advancing the laser beam 24 along the beam travel pattern 94 while at the same time gyrating the laser beam 24, the keyhole 68 (if present) and the molten metal weld pool 66 that surrounds the optional keyhole 68 are translated along a corresponding route within the workpiece stack-up 10 and relative to the top surface 20 since they track the movement of the laser beam 24. Such advancement of the laser beam 24 causes the penetrating molten metal weld pool 66 to flow around and behind the beam spot 44 within the workpiece stack-up 10, resulting in the molten metal weld pool 66 elongating in the wake of the advancing progression of the beam spot 44. Upon continued advancement and/or halting transmission of the laser beam 24, the molten workpiece material produced by the gyration and optional advancement of the laser beam 24 cools and solidifies into resolidified composite workpiece material 130. And, depending on exactly how the laser beam 24 is maneuvered, the molten metal weld pool 66 may solidify into a defined trail of resolidified composite workpiece material 130, or it may merge and grow into a larger melt puddle that solidifies into a consolidated nugget of resolidified composite workpiece material 130. Regardless of its final shape and structure, the collective resolidified composite metal workpiece material 130 constitutes the laser weld joint 64 that autogenously fusion welds the metal workpieces 12, 14 together at the weld site 16.

Figure 2A:
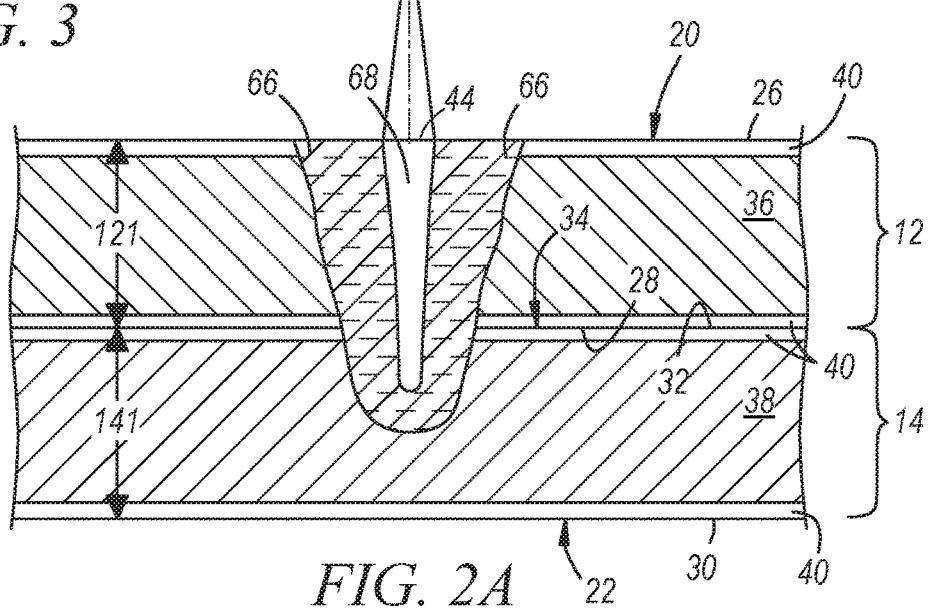
FIG. 2A is a cross-sectional side view of the workpiece stack-up depicted in FIG. 1 along with a molten metal weld pool and a keyhole produced by a laser beam, wherein both the molten metal weld pool and the keyhole partially penetrate the workpiece stack-up.

The depth of penetration of the keyhole 68 and the surrounding molten metal weld pool 66 is controlled during gyration and optional advancement of the beam spot 44 of the laser beam 24 to ensure the metal workpieces 12, 14 are fusion welded together by the laser weld joint 64. In particular, as mentioned above, the keyhole 68 (if present) and the molten metal weld pool 66 penetrate into the workpiece stack-up 10 and intersect the faying interface 34 established between the first and second metal workpieces 12, 14. The keyhole 68 and the molten metal weld pool 66 may fully or partially penetrate the workpiece stack-up 10. For instance, in a preferred embodiment, the keyhole 68 and the molten metal weld pool 66 fully penetrate the workpiece stack-up 10 when the first and second metal workpieces 12, 14 are steel workpieces, but only partially penetrate the workpiece stack-up 10 when the first and second metal workpieces 12, 14 are aluminum workpieces. A fully penetrating keyhole 68 and molten metal weld pool 66 extend entirely through the first and second metal workpieces from the top surface 20 to the bottom surface 22 of the workpiece stack-up 10, as illustrated in FIG. 2. A partially penetrating keyhole 68 and molten metal weld pool 66, on the other hand, extend entirely through the first metal workpiece 12 but only partially through the second metal workpiece 14, as illustrated in FIG. 2A.

FIGS. 1-16 illustrate the above-described embodiments of the disclosed laser welding method in the context of the workpiece stack-up 10 being a "2T" stack-up that includes only the first and second metal workpieces 12, 14 with their single faying interface 34. The same laser welding method, however, may also be carried out when the workpiece stack-up 10 is a "3T" stack-up that includes an additional third metal workpiece 150, having a thickness 151, that overlaps and is situated between the first and second metal workpieces 12, 14, as depicted in FIGS. 17-18. In fact, regardless of whether the workpiece stack-up 10 is a 2T or a 3T stack-up, the laser welding method does not have to be modified all that much to form the laser weld joint 64. And, in each instance, the laser weld joint 64 can achieve good mechanical properties by gyrating the laser beam 24 to move the focal point 52 of the laser beam 24 along at least one helical path 70 having a central helix axis 72 oriented transverse to the top and bottom surfaces 20, 22 of the workpiece stack-up, in addition to optionally advancing the laser beam 24 along a beam travel pattern 94 in certain situations, as described in detail above.

Referring now to FIG. 17, the additional third metal workpiece 150, if present, includes a third base metal substrate 152 that may be optionally coated with the same surface coating 40 described above. When the workpiece stack-up 10 includes the first, second, and third overlapping metal workpieces 12, 14, 150, the base metal substrate 36, 38, 152 of at least one of the workpieces 12, 14, 150, and sometimes all of them, may include the surface coating 40. As for the characteristics (e.g., composition, thickness, etc.) of the third base metal substrate 152, the descriptions above regarding the first and second base metal substrates 36, 38 of the same base metal group (i.e., steel or aluminum) are equally applicable to that substrate 152 as well. It should be noted, though, that while the same general descriptions apply to the several metal workpieces 12, 14, 150, there is no requirement that the metal workpieces 12, 14, 150 be identical to one another. In many instances, the first, second, and third metal workpieces 12, 14, 150 are different in some aspect whether it be composition, thickness, and/or form, despite being in the same base metal group.

As a result of stacking the first, second, and third metal workpieces 12, 14, 150 in overlapping fashion to provide the workpiece stack-up 10, the third metal workpiece 150 has two faying surfaces 154, 156. One of the faying surfaces 154 overlaps and confronts the first faying surface 28 of the first metal workpiece 12 and the other faying surface 156 overlaps and confronts the second faying surface 32 of the second metal workpiece 14, thus establishing two faying interfaces 158, 160 within the workpiece stack-up 10 that extend through the weld site 16. These faying interfaces 158, 160 are the same type and encompass the same attributes as the faying interface 34 already described above with respect to FIGS. 1-16. Consequently, in this embodiment as described herein, the exterior outer surfaces 26, 30 of the flanking first and second metal workpieces 12, 14 still face away from each other in opposite directions and constitute the top and bottom surfaces 20, 22 of the workpiece stack-up 10.

The laser weld joint 64 is formed in the "3T" workpiece stack-up 10 by the laser beam 24 in the same manner as previously described. In particular, the laser beam 24 is directed at, and impinges, the top surface 20 of the workpiece stack-up 10 (also the exterior outer surface 26 of the first metal workpiece 12). The absorption of the focused energy of the laser beam 24 creates the molten metal weld pool 66 and, optionally, the keyhole 68 within the weld pool 66 beneath the beam spot 44 of the laser beam 24. The keyhole 68 and the molten metal weld pool 66 penetrate into the workpiece stack-up 10 from the top surface 20 towards the bottom surface 22, either fully or partially, and intersect each of the faying interfaces 158, 160 established within the stack-up 10. As soon as the laser beam 24 impinges the top surface 20 of the workpiece stack-up 10, or soon thereafter, the laser beam 24 is gyrated to move the focal point 52 of the beam 24 along at least one helical path 70. The movement of the focal point 52 along the helical path 70 results in the focal point 52 being wound around the central helix axis 72 along a plurality of turnings 76. The helical path 70 followed by the focal point 52 of the laser beam 24 may assume a variety of geometric configurations including those specific embodiments described above.

The focal point 52 may be moved along a single helical path 70 or a plurality of helical paths 70 during formation of the laser weld joint 64. A single helical path 70 may be followed by the focal point 52 of the laser beam 24 when, for example, the maximum radius of the plurality of turnings 76 is large enough to cause the beam spot 44 of the laser beam 24 to be advanced relative to the top surface 20 of the workpiece stack-up 10 in a two-dimensional course that reflects the movement of the focal point 52 along the helical path 70 so as to form a laser weld joint 64 of adequate size. In other scenarios, such as when the maximum radius of the plurality of turnings 76 is relatively small, the laser beam 24 and thus the beam spot 44 may be advanced in the mean forward direction 92 along the beam travel pattern 94 relative to the top surface 20 of the workpiece stack-up 10, while at the same time being gyrated, so as to alternately convey the focal point 52 back-and-forth along a plurality of helical paths 70 in opposite overall axial directions as the laser beam 24 is progressing along the travel pattern 94. Such additional maneuvering of the laser beam 24 helps to ultimately obtain a laser weld joint 64 of sufficient size. In either case, as illustrated in FIG. 18, the resultant laser weld joint 64 formed by the laser beam 24 includes resolidified composite workpiece material 130—which is derived from each of the metal workpieces 12, 14, 150—and thus serves to autogenously fusion weld the first, second, and third metal workpieces 12, 14, 150 together at the weld site 16.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up that includes at least two overlapping metal workpieces, the method comprising:

providing a workpiece stack-up that includes overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein all of the overlapping metal workpieces of the workpiece stack-up are steel workpieces or aluminum workpieces;

directing a laser beam at the top surface of the workpiece stack-up, the laser beam impinging the top surface and creating a molten metal weld pool that penetrates into the workpiece stack-up from the top surface towards the bottom surface and that intersects each faying interface established within the workpiece stack-up;

gyrating the laser beam to move a focal point of the laser beam along a helical path having a central helix axis oriented transverse to the top and bottom surfaces of the workpiece stack-up, the movement of the focal point of the laser beam along the helical path resulting in the focal point winding around the central helix axis along a plurality of turnings of the helical path, each of the plurality of turnings having a pitch measured parallel to the central helix axis of the helical path such that the focal point is conveyed in an overall axial direction oriented parallel to the central helix axis as the focal point is moved along the plurality of turnings of the helical path; and halting transmission of the laser beam to the top surface of the workpiece stack-up to form a laser weld joint comprised of resolidified composite workpiece material derived from each of the metal workpieces penetrated by the molten metal weld pool, the laser weld joint fusion welding each of the overlapping metal workpieces together.

2. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the first and second faying surfaces of the first and second metal workpieces overlap and confront to establish the faying interface.

3. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the workpiece stack-up comprises a third metal workpiece situated between the first and second metal workpieces, the third metal workpiece having opposed faying surfaces, one of which overlaps and confronts the first faying surface of the first metal workpiece to establish a first faying interface and the other of which overlaps and confronts the second faying surface of the second metal workpiece to establish a second faying interface.

4. The method set forth in claim 1, wherein the plurality of turnings of the helical path includes two to two hundred turnings, and wherein the pitch of each of the plurality of turnings ranges from 10 µm to 5000 µm.

5. The method set forth in claim 1, wherein a length of the helical path ranges from 0.5 mm to 30 mm.

6. The method set forth in claim 1, wherein gyrating the laser beam comprises:

moving the focal point of the laser beam along a first helical path having a first central helix axis, the movement of the focal point of the laser beam along the first helical path resulting in the focal point winding around the first central helix axis along a plurality of first turnings of the first helical path in a first overall axial direction; and moving the focal point of the laser beam along a second helical path having a second central helix axis, the movement of the focal point of the laser beam along the second helical path resulting in the focal point winding around the second central helix axis along a plurality of second turnings of the second helical path in a second overall axial direction opposite the first overall axial direction.

7. The method set forth in claim 6, further comprising:
advancing the laser beam along a beam travel pattern relative to the top surface of the workpiece stack-up while gyrating the laser beam to alternately convey the focal point of the laser beam in the first overall axial direction and the second overall axial direction along the first helical path and the second helical path, respectively.

8. The method set forth in claim 7, further comprising:
continuing to move the focal point of the laser beam along additional helical paths after the first and second helical paths so as to continue alternately conveying the focal point in the first overall axial direction and the second overall axial direction while advancing the laser beam along the beam travel pattern.

9. The method set forth in claim 1, wherein a keyhole is produced within the molten metal weld pool by the laser beam.

10. The method set forth in claim 1, wherein the overlapping metal workpieces of the workpiece stack-up are steel workpieces, and wherein at least one of the steel workpieces includes a surface coating comprised of a zinc-based material or an aluminum-based material.

11. The method set forth in claim 1, wherein the overlapping metal workpieces of the workpiece stack-up are aluminum workpieces, and wherein at least one of the aluminum workpieces includes a surface coating comprised of a refractory oxide material.

12. The method set forth in claim 1, wherein the helical path is a cylindrical helical path.

13. The method set forth in claim 1, wherein the helical path is a conical helical path.

14. The method set forth in claim 1, wherein the helical path includes an upper conical helical portion and a lower conical helical portion, and wherein turnings of the upper conical helical portion and turnings of the lower conical helical portion decrease in diameter towards one another.

15. The method set forth in claim 1, wherein the laser beam is a solid-state laser beam, and wherein directing the laser beam at the top surface of the workpiece stack-up, and gyrating the laser beam, is performed by a remote laser welding apparatus.

16. A method of laser welding a workpiece stack-up that includes at least two overlapping metal workpieces, the method comprising:
providing a workpiece stack-up that includes overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein all of the overlapping metal workpieces of the workpiece stack-up are steel workpieces or aluminum workpieces;
directing a solid-state laser beam at the top surface of the workpiece stack-up using a remote laser welding apparatus, the laser beam impinging the top surface and creating a keyhole and a molten metal weld pool surrounding the keyhole, each of the keyhole and the molten metal weld pool penetrating into the workpiece stack-up from the top surface towards the bottom surface and intersecting each faying interface established within the workpiece stack-up;
gyrating the laser beam to alternately move a focal point of the laser beam along a plurality of helical paths that includes at least a first helical path and a second helical path so as to convey the focal point back-and-forth in a first overall axial direction and a second overall axial direction, respectively, the movement of the focal point along the first helical path resulting in the focal point winding around a first central helix axis along a plurality of first turnings in the first overall axial direction, and the movement of the focal point along the second helical path resulting in the focal point winding around a second central helix axis along a plurality of second turnings in the second overall axial direction that is opposite the first overall axial direction, each of the first central helix axis and the second central helix axis being oriented transverse to the top and bottom surfaces of the workpiece stack-up; and
advancing the laser beam along a beam travel pattern relative to the top surface of the workpiece stack-up to translate the keyhole and the surrounding molten metal weld pool along a corresponding route within the workpiece stack-up while gyrating the laser beam to move the focal point of the laser beam along the plurality of helical paths.

17. The method set forth in claim 16, wherein the workpiece stack-up includes two metal workpieces that establish a single faying interface, or three metal workpieces that establish two faying interfaces.

18. The method set forth in claim 16, wherein alternately moving the focal point of the laser beam along the plurality of helical paths is performed within a space extending from 100 mm below the bottom surface of the workpiece stack-up to 100 mm above the top surface of the workpiece stack-up.

19. The method set forth in claim 16, wherein each helical path in the plurality of helical paths has the same geometric configuration.

20. A method of laser welding a workpiece stack-up that includes at least two overlapping metal workpieces, the method comprising:
providing a workpiece stack-up that includes overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein all of the overlapping metal workpieces of the workpiece stack-up are steel workpieces or aluminum workpieces;
operating a scanning optic laser head to direct a solid-state laser beam at the top surface of the workpiece stack-up, the laser beam forming a keyhole within the workpiece stack-up that penetrates into the workpiece stack-up from the top surface towards the bottom surface and intersects each faying interface established within the workpiece stack-up;
operating the scanning optic laser head to form a laser weld joint that fusion welds the overlapping metal workpieces together by advancing the laser beam along a beam travel pattern relative to the top surface of the workpiece stack-up, which translates the keyhole along a corresponding route within the workpiece stack-up, and further gyrating the laser beam to move a focal point of the laser beam along a plurality of helical paths as the laser beam is being advanced along the beam travel pattern, each of the plurality of helical paths having a central helix axis oriented transverse to the top and bottom surfaces of the workpiece stack-up, so as to alternately convey the focal point in a first overall axial direction and a second overall axial direction as the laser beam is being advanced along the beam travel pattern, each the plurality of helical paths extending entirely through the workpiece stack-up along its respective first or second overall axial direction.

* * * * *